US011740920B2

(12) United States Patent
Huilgol et al.

(10) Patent No.: US 11,740,920 B2
(45) Date of Patent: Aug. 29, 2023

(54) METHODS AND SYSTEMS FOR MIGRATING VIRTUAL FUNCTIONS IN ASSOCIATION WITH VIRTUAL MACHINES

(71) Applicant: Pensando Systems Inc., Milpitas, CA (US)

(72) Inventors: Chaitanya Huilgol, Bengaluru (IN); Balakrishnan Raman, Fremont, CA (US); Harinadh Nagulapalli, San Jose, CA (US); Murty Subba Rama Chandra Kotha, San Jose, CA (US); Sanjay Shanbhogue, Santa Clara, CA (US); Varada Raja Kumar Kari, Bengaluru (IN); Vishwas Danivas, Santa Clara, CA (US)

(73) Assignee: Pensando Systems Inc., Milpitas, CA (US)

( * ) Notice: Subject to any disclaimer, the term of this patent is extended or adjusted under 35 U.S.C. 154(b) by 324 days.

(21) Appl. No.: 17/066,246

(22) Filed: Oct. 8, 2020

(65) Prior Publication Data
US 2022/0091872 A1 Mar. 24, 2022

Related U.S. Application Data

(60) Provisional application No. 63/082,413, filed on Sep. 23, 2020.

(51) Int. Cl.
*G06F 9/455* (2018.01)
*G06F 13/42* (2006.01)

(52) U.S. Cl.
CPC ...... *G06F 9/45558* (2013.01); *G06F 13/4221* (2013.01); *G06F 2009/4557* (2013.01);
(Continued)

(58) Field of Classification Search
CPC ........ G06F 9/45558; G06F 2009/4557; G06F 2009/45579; G06F 2009/45583; G06F 2009/45595
See application file for complete search history.

(56) References Cited

U.S. PATENT DOCUMENTS

| 10,083,053 B2* | 9/2018 | Dong | H04L 49/70 |
| 2012/0042034 A1* | 2/2012 | Goggin | G06F 3/0647 709/216 |

(Continued)

OTHER PUBLICATIONS

Infiniband, "Annex 18: Virtualization", InfiniBand Architecture Release 1.3 , vol. 1—General Specifications, Nov. 7, 2016, 32 pages.

(Continued)

*Primary Examiner* — Dong U Kim
(74) *Attorney, Agent, or Firm* — Loza & Loza, LLP

(57) ABSTRACT

Virtual functions (VFs) running on SR-IOV (single root IO virtualization) capable PCIe devices can migrate in association with VMs using the VFs. A SR-IOV capable PCIe device installed in a host computer can implement the VFs. A VM running on the host and associated with the VF can use the VF to obtain a service such as network communications or access to a NAS device. Migrating the VF in association with the VM can include halting the VM in a VM state on the host, halting the VF in a PCIe state and then obtaining a PCIe state data, restarting the VF in the PCIe state on a second PCIe device of a second host based on the PCIe state data, and restarting the VM in the VM state on the second host, wherein the VM is configured to use the VF on the second PCIe device.

19 Claims, 21 Drawing Sheets

(52) U.S. Cl.
CPC .............. *G06F 2009/45579* (2013.01); *G06F 2009/45583* (2013.01); *G06F 2009/45595* (2013.01); *G06F 2213/0026* (2013.01)

(56) References Cited

U.S. PATENT DOCUMENTS

| 2017/0242720 | A1* | 8/2017 | Anand | G06F 3/0619 |
| 2020/0159969 | A1* | 5/2020 | Shanbhogue | G06F 13/4282 |
| 2020/0334064 | A1* | 10/2020 | Jiang | G06F 13/4282 |

OTHER PUBLICATIONS

Infiniband, "Annex A16: RDMA over Converged Ethernet (RoCE)", Supplement to InfiniBand Architecture Specification, vol. 1, Release 1.2.1, Apr. 6, 2010, 19 pgs.

Infiniband, "Annex A17: RoCEv2", Supplement to InfiniBand, Architecture Specification, vol. 1, Release 1.2.1 Sep. 2, 2014, 23 pgs.

Infiniband, "InfiniBandTM Architecture Specification", vol. 1, Release 1.4, Apr. 7, 2020, 1981 pgs.

NVM Express, "NVM Express over Fabrics", Revision 1.1, Oct. 22, 2019, 83 pgs.

NVM Express, "Base Specification", NVM Express, Revision 1.4, Jun. 10, 2019, 403 pgs.

PCI Express, "Base Specification", Revision 2.1, Mar. 4, 2009, 720 pgs.

Chadalapaka, M. et al. "Internet Small Computer System Interface (iSCSI) Protocol (Consolidated)", https://tools.ietf.org/html/rfc7143, retrieved Jul. 31, 2020, 295 pgs.

PCI Express, "Single Root I/O Virtualization and Sharing Specification", Revision 1.1, Jan. 20, 2010, 100 pgs.

* cited by examiner

PCIe Registers for NVMe Devices

| Start | End | Name | Type |
|---|---|---|---|
| 0 | 3Fh | PCI Header | |
| PMCAP | PMCAP+7h | PCI Power Management Capability | PCI Capability |
| MSICAP | MSICAP+9h | Message Signaled Interrupt Capability | PCI Capability |
| MSXICAP | MSIXCAP+Bh | MSI-X Capability | PCI Capability |
| PXCAP | PXCAP+29h | PCI Express Capability | PCI Capability |
| AERCAP | AERCAP+47h | Advanced Error Reporting Capability | PCI Express Extended Capability |

FIG. 7

PCIe Header for NVMe Device

| Device ID | | Vendor ID | | 00h |
|---|---|---|---|---|
| Status | | Command | | 04h |
| Class Code | | Revision ID | | 08h |
| BIST | Header Type | Latency Timer | Cache Line Size | 0Ch |
| BAR0 - Memory Register Base Address, lower 32-bits | | | | 10h |
| BAR1 - Memory Register Base Address, upper 32-bits | | | | 14h |
| BAR 2 – Index/Data Pair Register Base Address (I/O Space) or Vendor Specific | | | | 18h |
| BAR 3 (Vendor Specific) | | | | 1Ch |
| BAR 4 (Vendor Specific) | | | | 20h |
| BAR 5 (Vendor Specific) | | | | 24h |
| Cardbus CIS Pointer | | | | 28h |
| Subsystem ID | | Subsystem Vendor ID | | 2Ch |
| Expansion ROM Base Address | | | | 30h |
| Reserved | | Capabilities Pointer | | 34h |
| Reserved | | | | 38h |
| Max Lat. | Min Gnt. | Interrupt Pin | Interrupt Line | 3Ch |

FIG. 8

NVMe Device Registers
Located at PCI BAR0 and BAR1
(Note:All reserved properties and all reserved bits within
properties are read-only and return 0h when read. )

| 31 | 24 23 | 16 15 | 8 7 | 0 | |
|---|---|---|---|---|---|
| | | | | | 00h |
| Controller Capabilities ||||| 04h |
| Version ||||| 08h |
| INTMS (Reserved) ||||| 0Ch |
| INTMC (Reserved) ||||| 10h |
| Controller Configuration (CC) ||||| 14h |
| Reserved (Reserved) ||||| 18h |
| Controller Status (CSTS) ||||| 1Ch |
| NVM Subsystem Reset (Optional) (NSSR) ||||| 20h |
| Admin Queue Attributes (AQA) (Reserved) ||||| 24h |
| Admin Submission Queue Base Address (ASQ) (Reserved) ||||| 28h |
| ||||| 2Ch |
| Admin Completion Queue Base Address (ACQ) (Reserved) ||||| 30h |
| ||||| 34h |
| CMBLOC (Reserved) ||||| 38h |
| CMBSZ (Reserved) ||||| 3Ch |
| Reserved ||||| ⋮ |
| ||||| EFFh |
| Reserved - Command Set Specific (The property address range from 0h to FFFh is reserved for functionality that is equivalent to the register functionality defined for NVMe over PCIe.) ||||| ⋮ |
| ||||| FFFh |
| Reserved - Reserved for Fabrics definition (The property address range from 1000h to 12FFh is reserved for definition by NVMe over Fabrics.) ||||| ⋮ |
| ||||| 12FFh |

Extended Capabilities Registers for NVME Single Root I/O Virtualization

| Next Capability Offset | Capability Version | PCI Express Extended Capability ID | 00h |
|---|---|---|---|
| SR-IOV Capabilities ||| 04h |
| SR-IOV Status || SR-IOV Control | 08h |
| TotalVFs (RO) || InitialVFs (RO) | 0Ch |
| RsvdP | Function Dependency Link (RO) | NumVFs (RW) | 10h |
| VF Stride (RO) || First VF Offset (RO) | 14h |
| VF Device ID (RO) || RsvdP | 18h |
| Supported Page Sizes (RO) ||| 1Ch |
| System Page Size (RW) ||| 20h |
| VF BAR0 (RW) ||| 24h |
| VF BAR1 (RW) ||| 28h |
| VF BAR2 (RW) ||| 2Ch |
| VF BAR3 (RW) ||| 30h |
| VF BAR4 (RW) ||| 34h |
| VF BAR5 (RW) ||| 38h |
| VF Migration State Array Offset (RO) ||| 3Ch |

FIG. 10

METHODS AND SYSTEMS FOR MIGRATING VIRTUAL FUNCTIONS IN ASSOCIATION WITH VIRTUAL MACHINES

TECHNICAL FIELD

The embodiments relate to computer networks, network appliances, network switches, network routers, P4 packet processing pipelines, programmable packet processing pipelines implemented using special purpose circuitry, PCIe (peripheral component interconnect extended) cards, SR-IOV (singe root input/output virtualization), VMs (virtual machines), NVMe (non-volatile extended) interfaces, and network attached storage.

BACKGROUND

A PCIe NIC (network interface card) installed in a host computer can receive packets at input interfaces, process the received packets, and then forward the packets to one or more output interfaces. The I/O interfaces can include Ethernet ports, the card's PCIe interface, and other I/O interfaces. The host computer can run one or more VMs under the control of a hypervisor. The VMs can perform IO operations with a computer network, local storage, remote storage, etc. via the host computer's I/O hardware and as regulated by the hypervisor.

BRIEF SUMMARY OF SOME EXAMPLES

The following presents a summary of one or more aspects of the present disclosure in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

One aspect of the subject matter described in this disclosure can be implemented in a method. The method can include running a virtual machine (VM) on a host that includes a peripheral component interconnect express (PCIe) device using single root input out virtualization (SR-IOV) to implement a virtual function (VF), the VM configured to use the VF on the PCIe device, halting the VM in a VM state on the host, and halting the VF in a PCIe state and then obtaining a PCIe state data. The method can also include restarting the VF in the PCIe state on a second PCIe device of a second host based on the PCIe state data, and restarting the VM in the VM state on the second host, wherein the VM is configured to use the VF on the second PCIe device.

Another aspect of the subject matter described in this disclosure can be implemented in a peripheral component interconnect express (PCIe) device using single root input out virtualization (SR-IOV). The PCIe device can be configured to implement a virtual function (VF) used by a virtual machine (VM) running in a host that includes the PCIe device, the host configured to halt the VM and generate a VM image, and halt the VF in a PCIe state and generate a PCIe state data associated with the VM image. The VM can be configured to be restarted in a VM state based on the VM image, wherein the VF is configured to be restarted in the PCIe state based on the PCIe state data, and wherein the VM uses the VF after the VM is restarted in the VM state and the VF is restarted in the PCIe state.

Yet another aspect of the subject matter described in this disclosure can be implemented by a system. The system can include a means for running a virtual function (VF) used by a virtual machine (VM) running in a host, the VF implemented via single root IO virtualization, a means for migrating the VM and the VF to a second host, wherein a VF state and a VM state are preserved during migration, and a means for running the VF and the VM in the second host, the VM using the VF after migration.

In some implementations of the methods and devices, the VF has a VF state when halted on the host and the VF has the VF state when restarted on the second host, the VF state including a function specific internal state of the VF. In some implementations of the methods and devices the VF has a VF state when halted on the host and the VF has the VF state when restarted on the second host, the VF state including an IO queue of the VF. In some implementations of the methods and devices, the VF implements a network interface providing network access to the VM. In some implementations of the methods and devices, the VM accesses NVMe (Non-Volatile Memory Express) device registers associated with the VF.

In some implementations of the methods and devices, a connection between the VM and a remote non-volatile memory migrates to the second host when the VM and the VF migrate to the second host. In some implementations of the methods and devices, the VM accesses a remote non-volatile memory via the VF, and halting the VF includes suspending processing of commands received from the VM, suspending command issuance from a command queue, and draining in flight IO traffic. In some implementations of the methods and devices, the method includes pausing submission of new commands to a command queue by the VM by issuing an async notification. In some implementations of the methods and devices, the VF implements SR-IOV NVMe (Non-Volatile Memory Express) host side functions and provides access to a remote non-volatile memory.

In some implementations of the methods and devices, a second PCIe device is included, wherein the second PCIe device is installed in a second host, the VM is restarted in the second host, and the VF is restarted in the second PCIe device. In some implementations of the methods and devices, the VM accesses NVMe (Non-Volatile Memory Express) device registers associated with the VF, and the VM accesses a remote non-volatile memory via the VF. In some implementations of the methods and devices, issuing an async notification pauses submission of new commands to a command queue by the VM.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 7 is a memory map diagram illustrating a non-limiting example of PCIe registers for a NVMe (non-volatile memory extended) interface according to some aspects.

FIG. 8 is a memory map diagram illustrating a non-limiting example of a PCIe header for an NVMe device according to some aspects.

FIG. 9 illustrates a non-limiting example of NVMe device registers according to some aspects.

FIG. 10 illustrates a non-limiting example of extended capabilities registers for NVMe SR-IOV (single root input/output virtualization) according to some aspects.

Throughout the description, similar reference numbers may be used to identify similar elements.

DETAILED DESCRIPTION

Figure 1:
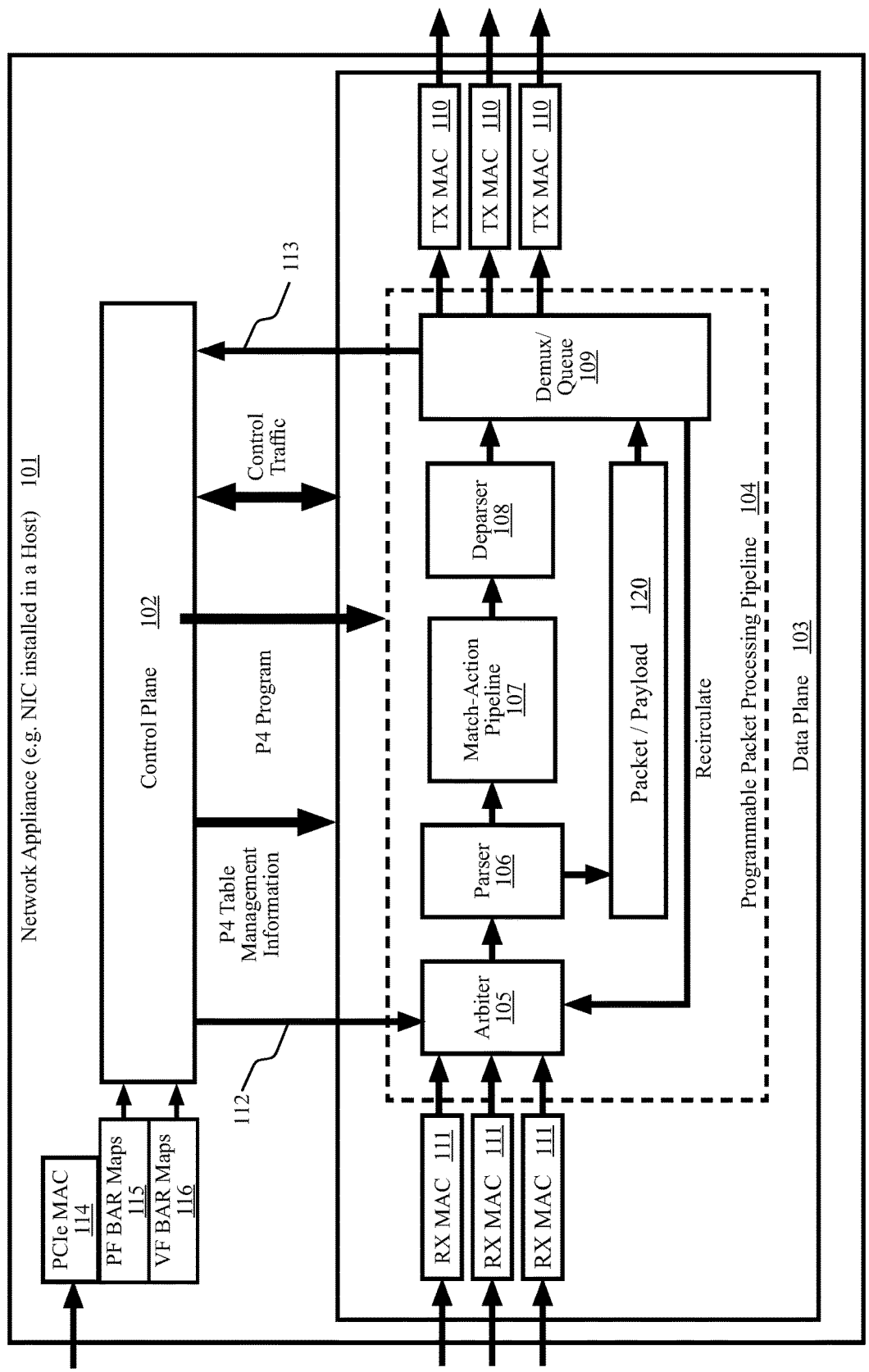
FIG. 1 is a functional block diagram of a network appliance having a control plane and a data plane and in which aspects may be implemented.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Host computers can use NICs (network interface cards) to access communications networks. VM's running on the host may also access the network using the NIC with a hypervisor intermediating the communication. The hypervisor acting as an intermediary can be a bottleneck slowing down the communications. SR-IOV (single root I/O virtualization) is a technology that may remove the bottleneck. PCIe SR-IOV was standardized in "Single Root I/O Virtualization and Sharing Specification Revision 1.1" published by PCI-SIG on Jan. 20, 2010. In accordance with the standard, a SR-IOV capable PCIe card can provide a PF (physical function) and numerous VFs (virtual functions). A host computer having an SR-IOV capable NIC can access the network via the NICs PF while each of the VMs can access the network using a VF that is uniquely associated with the VM. The host may manage the VFs via the PF interface.

Modern data centers can easily run tens of thousands of VMs on thousands of hosts. SR-IOV capable NICs can reduce the host's compute load while speeding the VMs network access. However, a problem can arise with migrating VMs between hosts because the VFs are not part of the VMs. The VFs are on the PCIe cards. Migrating a VM can therefore require deallocating the VM's initial VF, migrating the VM, and then setting up a different VF on the new host. This is a slow and cumbersome process that hinders VM migration.

Some NICs can implement software defined PFs and VFs. For example, the NIC discussed herein has a control plane that controls a configurable and programmable data plane. The NIC can thereby be configured via software to implement PFs and VFs. An exciting development is that VFs can be migrated in association with VMs due to the configurable nature of the NIC. Migrating both the VF and the VM allows for quicker migrations because the VM remains associated with the same VF. In many cases, stateful connections, such as TCP (transmission control protocol) connections can migrate along with the VF such that the VM never sees the connection drop and does not have to reestablish it.

A yet further advantage is that the NIC, due its configurability, can implement PFs and VFs that are NVMe interfaces. These PFs and VFs can access a NAS (network attached storage) device via a SAN (storage area network). In this case, the VF acting as a VMs NVMe interface can migrate along with the VM. As such, the VMs migration can be even more efficient as the VMs NVMe interface and perhaps even its connection to the NAS also migrate.

In the field of data networking, the functionality of network appliances such as switches, routers, and network interface cards (NICs) is often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network traffic flows, which include I/O traffic flows with a NAS, extremely quickly if the match-action pipeline is configured to process those traffic flows. Upon receiving a packet of a network traffic flow or a NVMe submission/completion, the match-action pipeline can generate an index from data in the packet header. Finding a flow table entry for the network traffic flow at the index location in the flow table is the "match" portion of "match-action". If there is a "match", the "action" is performed to thereby process the packet. If there is no flow table entry for the network traffic flow, it is a new network traffic flow that the match action pipeline is not yet configured to process. If there is no match, then the match-action pipeline can perform a default action.

FIG. 1 is a functional block diagram of a network appliance having a control plane 102 and a data plane 103 and in which aspects may be implemented. A network appliance 101, such as a NIC, can have a control plane 102 and a data plane 103. The control plane provides forwarding information (e.g., in the form of table management information) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. In some embodiments, the control plane may implement operations related to packet routing that include NVM Express (NVMe) controller management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). In some embodiments, the data plane (which may also be referred to as the "forwarding" plane) may implement operations related to parsing packet headers, Quality of Service (QoS), filtering, encapsulation, queuing, and policing. Although some functions of the control plane and data plane are described, other functions may be implemented in the control plane and/or the data plane.

The high-volume and rapid decision-making that occurs at the data plane is often implemented in fixed function application specific integrated circuits (ASICs). Although fixed function ASICs enable high-volume and rapid packet processing, fixed function ASICs typically do not provide enough flexibility to adapt to changing needs. Data plane processing can also be implemented in field programmable gate arrays (FPGAs) to provide a high level of flexibility in data plane processing. Although FPGAs are able to provide a high level of flexibility for data plane processing, FPGAs are relatively expensive to produce and consume much more power than ASICs on a per-packet basis.

Some techniques exist for providing flexibility at the data plane of network appliances that are used in data networks. For example, the concept of a domain-specific language for programming protocol-independent packet processors, known simply as "P4," has developed as a way to provide some flexibility at the data plane of a network appliance. The P4 domain-specific language for programming the data plane of network appliances is currently defined in the "P4$_{16}$ Language Specification," version 1.2.0, as published by the P4 Language Consortium on Oct. 23, 2019, which is incorporated by reference herein. P4 (also referred to herein as the "P4 specification," the "P4 language," and the "P4 program") is designed to be implementable on a large variety of targets including programmable NICs, software switches, FPGAs, and ASICs. As described in the P4 specification, the primary abstractions provided by the P4 language relate to header types, parsers, tables, actions, match-action units, control flow, extern objects, user-defined metadata, and intrinsic metadata.

The data plane 103 includes multiple receive media access controllers (MACs) (RX MAC) 111 and multiple transmit MACs (TX MAC) 110. The RX MAC 111 implements media access control on incoming packets via, for example, a MAC protocol such as Ethernet. In an embodiment, the MAC protocol is Ethernet and the RX MAC is configured to implement operations related to, for example, receiving frames, half-duplex retransmission and backoff functions, Frame Check Sequence (FCS), interframe gap enforcement, discarding malformed frames, and removing the preamble, Start Frame Delimiter (SFD), and padding from a packet. Likewise, the TX MAC 110 implements media access control on outgoing packets via, for example, Ethernet. In an embodiment, the TX MAC is configured to implement operations related to, for example, transmitting frames, half-duplex retransmission and backoff functions, appending an FCS, interframe gap enforcement, and prepending a preamble, an SFD, and padding.

As illustrated in FIG. 1, a P4 program is provided to the data plane via the control plane 102. Communications between the control plane and the data plane can use a dedicated channel or bus, can use shared memory, etc. The P4 program includes software code that configures the functionality of the data plane 103 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane and the data plane corresponds to a class of algorithms that describe transformations on packets by packet processing systems.

The data plane 103 includes a programmable packet processing pipeline 104 that is programmable using a domain-specific language such as P4 and that can be used to implement the programmable packet processing pipeline 104. As described in the P4 specification, a programmable packet processing pipeline can include an arbiter 105, a parser 106, a match-action pipeline 107, a deparser 108, and a demux/queue 109. The data plane elements described may be implemented as a P4 programmable switch architecture, as a P4 programmable NIC, or some other architecture. The arbiter 105 can act as an ingress unit receiving packets from RX-MACs 111 and can also receive packets from the control plane via a control plane packet input 112. The arbiter 105 can also receive packets that are recirculated to it by the demux/queue 109. The demux/queue 109 can act as an egress unit and can also be configured to send packets to a drop port (the packets thereby disappear), to the arbiter via recirculation, and to the control plane 102 via an output CPU port 113. The control plane is often referred to as a CPU (central processing unit) although, in practice, control planes often include multiple CPU cores and other elements. The arbiter 105 and the demux/queue 109 can be configured through the domain-specific language (e.g., P4).

The parser 106 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. In an embodiment, the information extracted from a packet by the parser is referred to as a packet header vector or "PHV." In an embodiment, the parser identifies certain fields of the header and extracts the data corresponding to the identified fields to generate the PHV. In an embodiment, the PHV may include other data (often referred to as "metadata") that is related to the packet but not extracted directly from the header, including for example, the port or interface on which the packet arrived at the network appliance. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 108 is a programmable element that is configured through the domain-specific language (e.g., P4) to generate packet headers from PHVs at the output of match-action pipeline 107 and to construct outgoing packets by reassembling the header(s) (e.g., Ethernet and IP headers, NVME-oF packets, iSCSI packets, etc.) as determined by the match-action pipeline. In some cases, a packet payload may travel in a separate queue or buffer, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 108) before the demux/queue 109 sends the packet to the TX MAC 110 or recirculates it back to the arbiter 305 for additional processing.

A NIC 101 can have a PCIe (peripheral component interconnect extended) interface such as PCIe MAC 114. A PCIe MAC can have a BAR (base address register) at a base address in a host system's memory space. Processes, typically device drivers within the host systems operating system, can communicate with the NIC via a set of registers beginning with the BAR and relative to the BAR. Some PCIe devices are SR-IOV (single root input output virtualization) capable. Such PCIe devices can have a PF (physical function) and multiple virtual functions (VFs). A PF BAR map 115 can be used by the host machine to communicate with the PF of the PCIe card. A VF BAR map 116 can be used by a VM running on the host to communicate with a VF of the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an NVMe interface via another PF. As such, the NIC can provide "NIC" VFs and "NVMe" VFs to VMs running on the host. The NVMe PF and VFs can be used to access remote non-volatile storage on a NAS appliance via a SAN (storage area network).

Figure 2:
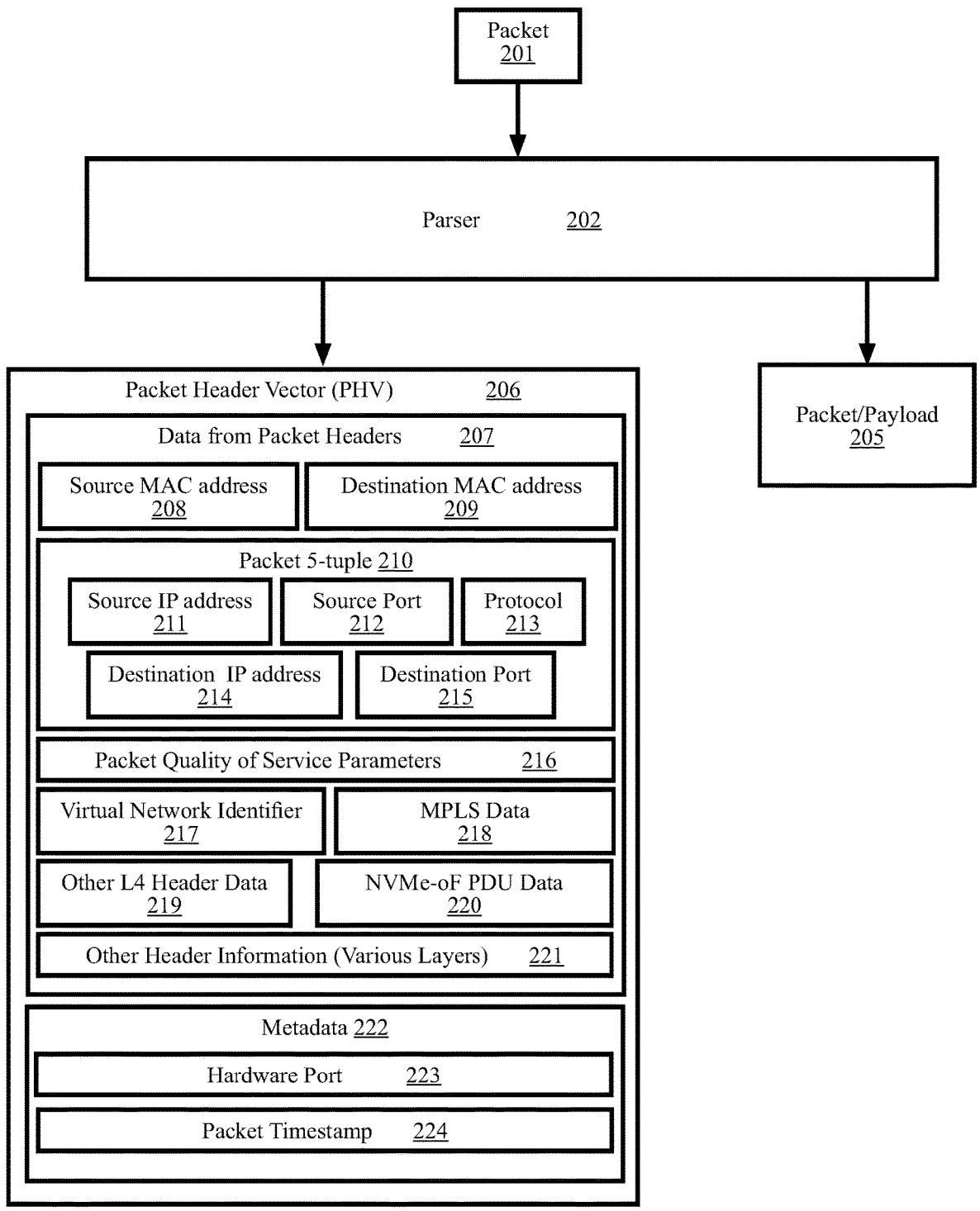
FIG. 2 is a high-level diagram illustrating an example of generating a packet header vector from a packet according to some aspects.

FIG. 2 is a high-level diagram illustrating an example of generating a packet header vector 206 from a packet 201 according to some aspects. The parser 202 can receive a packet 201 that has layer 2, layer 3, layer 4, and layer 7 headers and payloads. The parser can generate a packet header vector (PHV) from packet 201. The packet header vector 206 can include many data fields including data from packet headers 207 and metadata 222. The metadata 222 can include data generated by the network appliance such as the hardware port 223 on which the packet 201 was received and the packet timestamp 224 indicating when the packet 201 was received by the network appliance.

The source MAC address 208 and the destination MAC address 209 can be obtained from the packet's layer 2 header. The source IP address 211 can be obtained from the packets layer 3 header. The source port 212 can be obtained from the packet's layer 4 header. The protocol 213 can be obtained from the packet's layer 3 header. The destination IP address 214 can be obtained from the packet's layer 3 header. The destination port 215 can be obtained from the packets layer 4 header. The packet quality of service parameters 216 can be obtained from the packet's layer 3 header or another header based on implementation specific details. The virtual network identifier 217 may be obtained from the packet's layer 2 header. The multi-protocol label switching (MPLS) data 218, such as an MPLS label, may be obtained from the packet's layer 2 header. The other layer 4 data 219 can be obtained from the packet's layer 4 header. The NVMe-oF (NVMe over fiber) PDU (protocol data unit) data 220 can be obtained from the packet's layer 7 header and layer 7 payload. The other header information 221 is the other information contained in the packet's layer 2, layer 3, layer 4, and layer 7 headers.

The packet 5-tuple 210 is often used for generating keys for match tables, discussed below. The packet 5-tuple 210 can include the source IP address 211, the source port 212, the protocol 213, the destination IP address 214, and the destination port 215.

Those practiced in computer networking protocols realize that the headers carry much more information than that described here, realize that substantially all of the headers are standardized by documents detailing header contents and fields, and know how to obtain those documents. The parser can also be configured to output a packet or payload 205. Recalling that the parser 202 is a programmable element that is configured through the domain-specific language (e.g., P4) to extract information from a packet, the specific contents of the packet or payload 205 are those contents specified via the domain specific language. For example, the contents of the packet or payload 205 can be the layer 3 payload, the layer 4 payload, etc.

Those practiced in SAN (storage area network) protocols such as NVMe-oF, iSCSI (internet small computer systems interface), and Infiniband realize that the data packets communicated by SANs also have well defined and standardized formats. As such, SAN packets and packet headers can be easily created and processed by a programmable data plane such as the data plane of a P4 programmable NIC. Specifically, the parser can parse SAN packets, the match-action pipeline can process SAN packets, the deparser can assemble SAN packet headers and SAN packets, and the network appliance or NIC can send and receive SAN packets.

A NIC can receive packets via a PCIe interface in accordance with the PCIe specifications. The control plane can process the PCIe packets or the data plane can process the PCIe packets if configured to do so by the control plane. For example, the NIC can act as an NVMe interface that receives NVMe submissions from the host and that provides NVMe completions to the host. The data formats of NVMe submissions and completions are defined by the NVMe specifications. As such, the data plane can be configured by the control plane via P4 programming to process NVMe submissions from a VM running on the host to thereby produce NVMe-oF (or iSCSI, etc.) packets that are sent to a NAS device. The results from the NAS device can be processed by the data plane to produce NVMe completions that are provided to the VM. This example showcases the programmability of a P4 programmable NIC in that PCIe packets carrying NVMe submissions can be processed to send packets to a SAN device using any of the well documented SAN protocols and the results from the SAN device can be processed to produce NVMe completions. Here, the NIC is transparently translating between base protocols. It is understood that either the control plane or the data plane can process the NVMe submissions/completions and SAN transactions.

Figure 3:
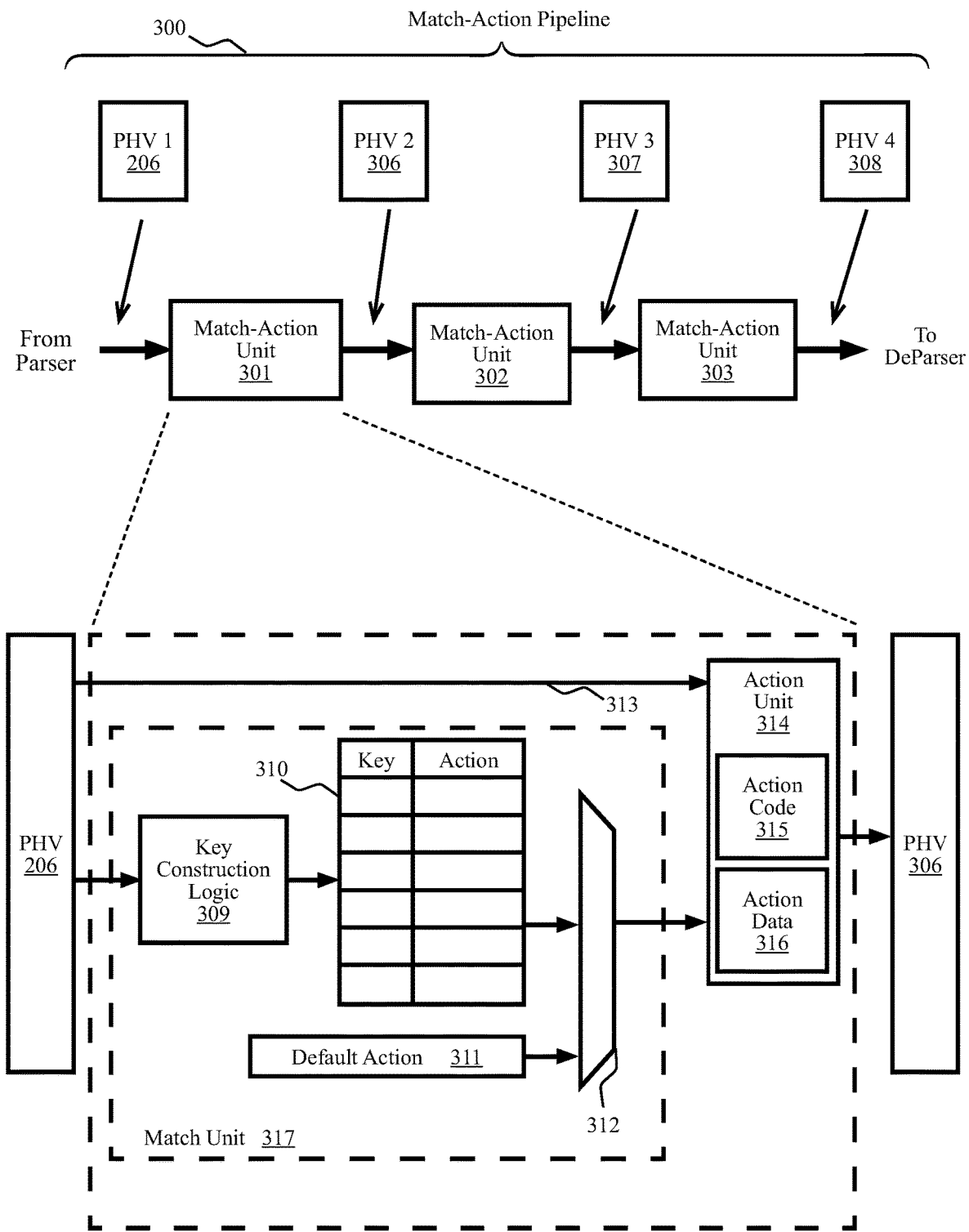
FIG. 3 is a functional block diagram illustrating an example of a match-action unit in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units 301, 302, 303 of the match-action pipeline 300 are programmed to perform "match-action" operations in which a match unit performs a lookup using at least a portion of the PHV and an action unit performs an action based on an output from the match unit. In an embodiment, a PHV generated at the parser is passed through each of the match-action units in the match-action pipeline in series and each match-action unit implements a match-action operation. The PHV and/or table entries may be updated in each stage of match-action processing according to the actions specified by the P4 programming. In some instances, a packet may be recirculated through the match-action pipeline, or a portion thereof, for additional processing. Match-action unit 1 301 receives PHV 1 206 as an input and outputs PHV 2 306. Match-action unit 2 302 receives PHV 2 306 as an input and outputs PHV 3 307. Match-action unit 3 303 receives PHV 3 307 as an input and outputs PHV 4 308.

An expanded view of elements of a match-action unit 301 of match-action pipeline 300 is shown. The match-action unit includes a match unit 317 (also referred to as a "table engine") that operates on an input PHV 206 and an action unit 314 that produces an output PHV 306, which may be a modified version of the input PHV 206. The match unit 317 can include key construction logic 309, a lookup table 310, and selector logic 312. The key construction logic 309 is configured to generate a key from at least one field in the PHV. The lookup table 310 is populated with key-action pairs, where a key-action pair can include a key (e.g., a lookup key) and corresponding action code 315 and/or action data 316. In an embodiment, a P4 lookup table generalizes traditional switch tables, and can be programmed to implement, for example, routing tables, flow lookup tables, ACLs, and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and data 313 to produce an output that is included in the output PHV 306. If no match is found in the lookup table, then a default action 311 may be implemented. A flow miss is an example of a default action that may be executed when no match is found. In an embodiment, operations of the match-action unit are programmable in the control plane via P4 and the contents of the lookup table is managed by the control plane.

Figure 4:
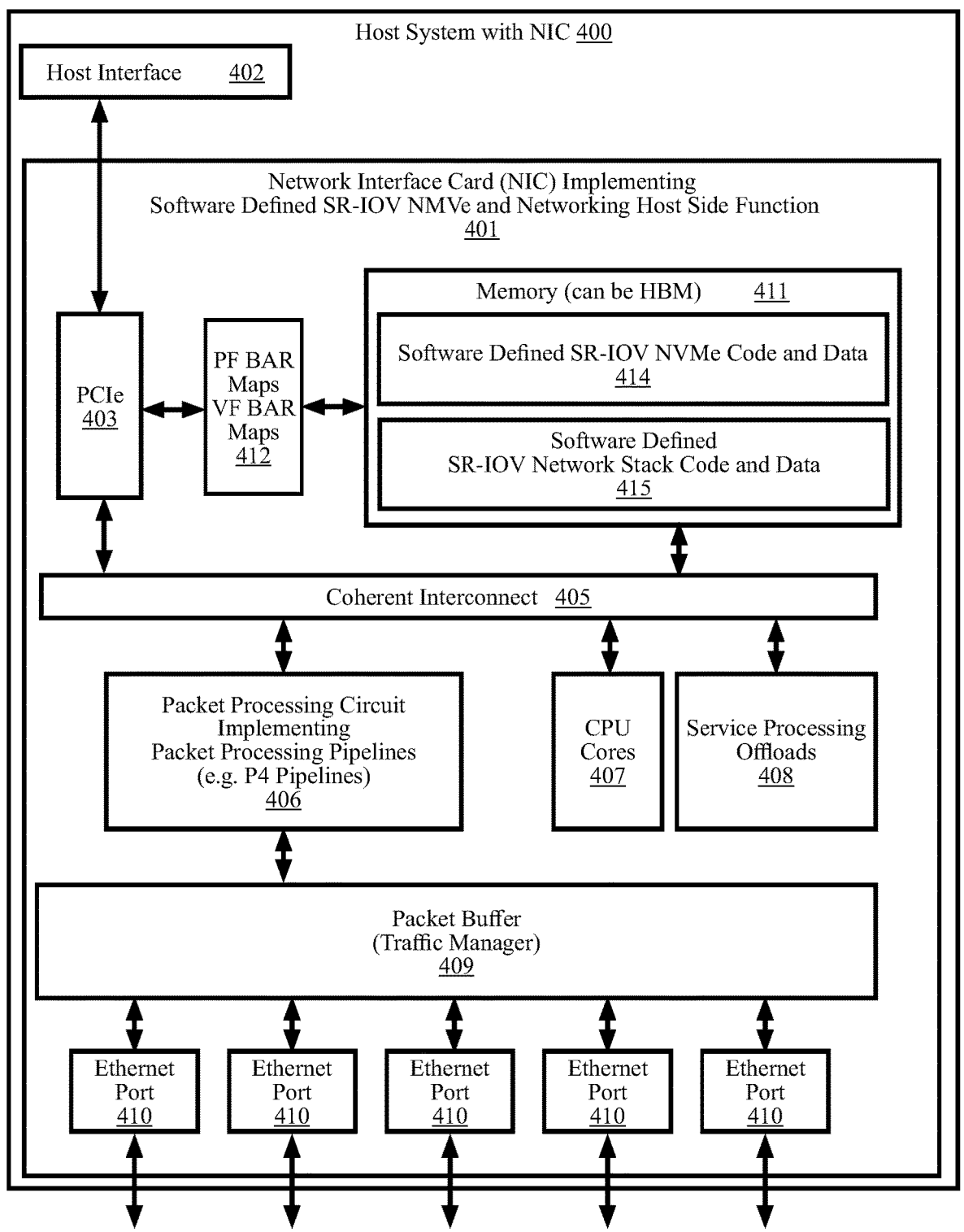
FIG. 4 is a high-level diagram of a network interface card (NIC) configured as a network appliance according to some aspects.

FIG. 4 is a high-level diagram of a network interface card (NIC) 401 configured as a network appliance according to some aspects. Aspects of the embodiments, including packet processing pipelines, fast data paths, and slow data paths, can be implemented in the NIC 401. The NIC 401 can be configured for operation within a host system 400. The host system can be a general-purpose computer with a host interface 402 such as a PCIe interface. The NIC 401 can have a PCIe interface 403 through which it can communicate with the host system 400. The NIC can also include a memory 411, a coherent interconnect 405, a packet processing circuit implementing a packet processing pipeline (e.g. P4 pipelines) 406, CPU cores 407, service processing offloads 408, packet buffer 409, and ethernet ports 410.

As discussed above, the P4 pipelines are configured for programming via a P4 domain-specific language for programming the data plane of network appliances that is currently defined in the "$P4_{16}$ Language Specification," version 1.2.0, as published by the P4 Language Consortium on Oct. 23, 2019. As such, the P4 pipeline's inputs, outputs, and operations may be constrained such that the P4 pipeline operates in accordance with the P4 language specification.

The NIC 401 can include a memory 411 for running Linux or some other operating system, for storing large data structures such as flow tables and other analytics, and for providing buffering resources for advanced features including TCP termination and proxy, deep packet inspection, storage offloads, and connected FPGA functions. The memory system may comprise a high bandwidth memory (HBM) module which may support 4 GB capacity, 8 GB capacity, or some other capacity depending on package and HBM. The HBM may be required for accessing full packets at wire speed. Wire speed refers to the speed at which packets can move through a communications network. For example, each of the ethernet ports can be a 100 Gbps port. Wire speed for the network appliance may therefore be operation at 100 Gbps for each port. HBMs operating at over 1 Tb/s are currently available.

In an embodiment, the CPU cores 407 are general purpose processor cores, such as ARM processor cores, MIPS (Microprocessor without Interlocked Pipeline Stages) processor cores, and/or x86 processor cores, as is known in the field. In an embodiment, each CPU core includes a memory interface, an ALU, a register bank, an instruction fetch unit, and an instruction decoder, which are configured to execute instructions independently of the other CPU cores. In an embodiment, the CPU cores are Reduced Instruction Set Computers (RISC) CPU cores that are programmable using a general-purpose programming language such as C.

In an embodiment, each CPU core 407 also includes a bus interface, internal memory, and a memory management unit (MMU) and/or memory protection unit. For example, the CPU cores may include internal cache, e.g., L1 cache and/or L2 cache, and/or may have access to nearby L2 and/or L3 cache. In an embodiment, each CPU core includes core-specific L1 cache, including instruction-cache and data-cache and L2 cache that is specific to each CPU core or shared amongst a small number of CPU cores. L3 cache may also be available to the CPU cores.

In an embodiment there are multiple CPU cores 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The service processing offloads 408 are specialized hardware modules purposely optimized to handle specific tasks at wire speed, such as cryptographic functions, compression/decompression, etc.

The packet buffer 409 can act as a central on-chip packet switch that delivers packets from the network interfaces 410 to packet processing elements of the data plane and vice-versa. The packet processing elements can include a slow data path implemented in software and a fast data path implemented by packet processing circuitry 406.

The packet processing circuit implementing packet processing pipelines 406 can be a specialized circuit or part of a specialized circuit using one or more ASICs or FPGAs to implement a programmable packet processing pipeline such as the programmable packet processing pipeline 104 of FIG. 1. Some embodiments include ASICs or FPGAs implementing a P4 pipeline as a fast data path within the network appliance. The fast data path is called the fast data path because it processes packets faster than a slow data path that can also be implemented within the network appliance. An example of a slow data path is a software implemented data path wherein the CPU cores 407 and memory 411 are configured via software to implement a slow data path. A network appliance having two data paths has a fast data path and a slow data path when one of the data paths processes packets faster than the other data path.

All memory transactions in the NIC 401, including host memory, on board memory, and registers may be connected via a coherent interconnect 405. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing circuit implementing packet processing pipelines 406, CPU cores 407, and PCIe interface 403. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches. The NOC cache may be used to aggregate memory write transactions which may be smaller than the cache line (e.g., size of 64 bytes) of an HBM.

The memory can contain data and executable code and data such as software defined SR-IOV network stack code and data 415. The PF BAR maps and VF BAR maps 412 can map PCIe register locations to specific locations within the NIC's memory 411. As such, the host and VMs can write to PCIe "registers" that are actually specified memory locations within the NIC's memory 411. The software defined SR-IOV network stack code is executable code that can be executed by the CPU cores to thereby implement NIC functionality. As such, the NIC PF and the NIC VF's are simply chunks of memory 411 that can be read and written by software defined SR-IOV network stack code. The PF's and VF's can therefore be termed "software defined" because the NIC can instantiate different numbers of PFs and VFs by allocated different amounts of memory 411 as PCIe registers. The NIC 401 can therefore implement one or more NIC PFs and an arbitrary number of NIC VFs.

The memory can contain data and executable code such as software defined SR-IOV NVMe code and data 414. Here, the executable code implements software defined NVMe interfaces. The NIC 401 can implement one or more NVMe interface PFs and an arbitrary number of NVMe interface VFs. Interestingly, the software defined NVMe interfaces may use the software defined NICs to access remote storage via a SAN.

Above, it was contemplated that the CPU cores execute the software defined SR-IOV network stack code and the software defined SR-IOV NVMe code. In practice, the packet processing pipeline 406 can be configured to process IO commands received via the PCIe interface. For example, the packet processing pipeline 406 can be configured to access the "registers" in memory 411 and thereby process IO commands therein. In another example, the CPUs can store the IO commands as packets within the packet buffer such that the packet processing pipeline 406 process the commands as it would process other packets received via any other interface or port.

Figure 5:
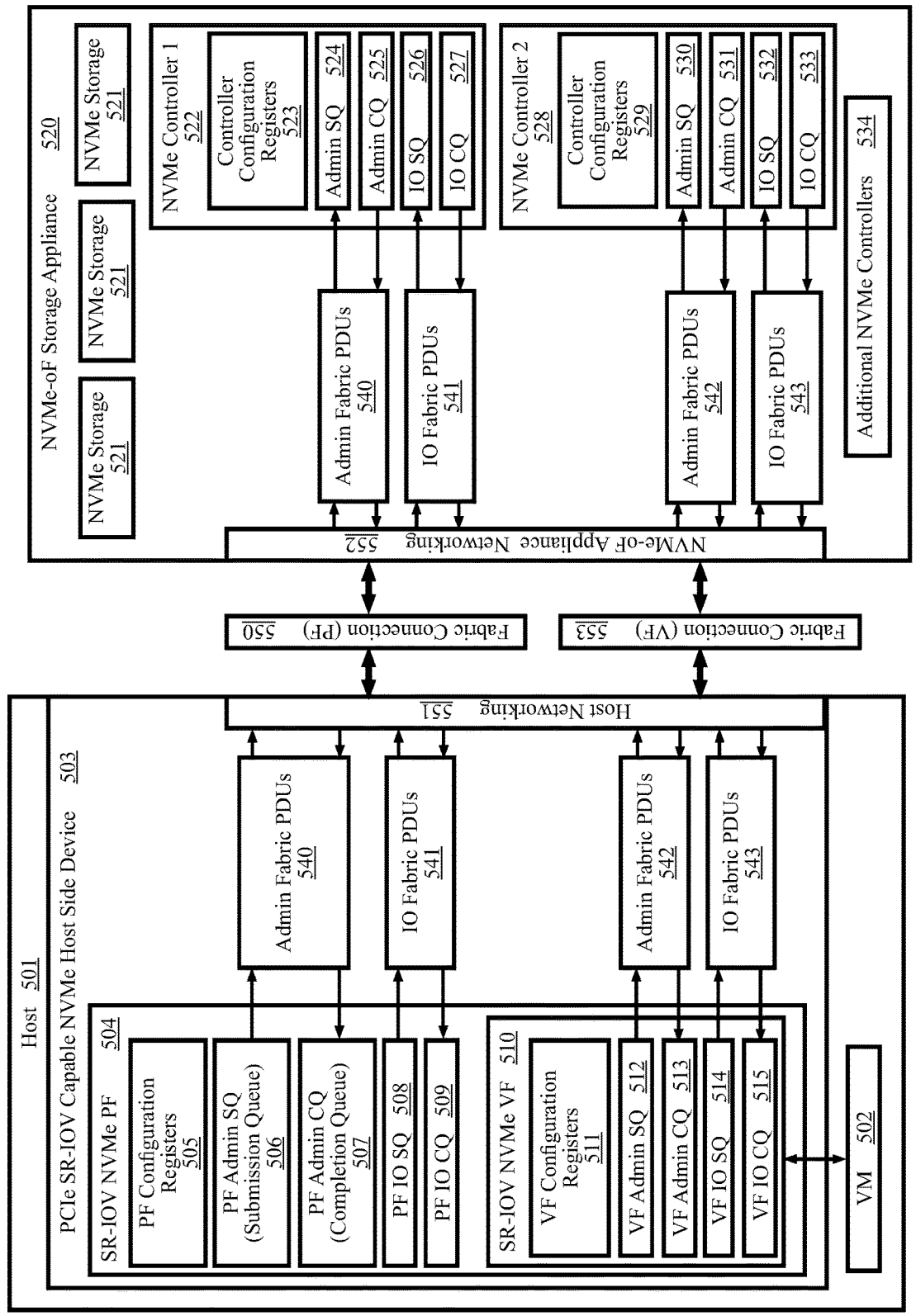
FIG. 5 is a high-level block diagram of a non-limiting example of a VM (virtual machine) running in a host computer and accessing a NAS (network attached storage) via a SR-IOV (single root input/output virtualization) PCIe (peripheral component interconnect extended) card according to some aspects.

FIG. 5 is a high-level block diagram of a non-limiting example of a VM 502 (virtual machine) running in a host computer 501 and accessing a NAS 520 (network attached storage) via a SR-IOV (single root input/output virtualization) PCIe (peripheral component interconnect extended) card 503 according to some aspects. The example of FIG. 5 is provided to introduce some of the base concepts and aspects of NVMe interfaces, NVMe controllers, and SANs. The PCIe SR-IOV capable NVMe host side device 503 can be a NIC as described above and, for brevity, will here be called a NIC. The NIC 503 can provide a PF 504 and one or more VFs 510. The PF 504 is a SR-IOV NVMe PF 504 and the VF 510 is a SR-IOV NVMe VF 510. The SR-IOV NVMe PF 504 can have PF configuration registers 505, a PF admin SQ (submission queue) 506, a PF admin CQ (completion queue) 507, a PF IO SQ 508, and a PF IO CQ 509. The SR-IOV NVMe VF 510 can have VF configuration registers 511, a VF admin SQ 512, a VF admin CQ 513, a VF IO SQ 514, and a VF IO CQ 515.

The NVMe host side device 503 can provide access to a NAS via a SAN. In FIG. 5, the NAS is a NVMe-oF storage appliance 520 having NVMe storage 521 that can be accessed via NVMe controller 1 522, NVMe controller 2 528, and additional NVMe controllers 534. NVMe controller 1 522 can have controller configuration registers 523, an admin SQ 524, an admin CQ 525, an IO SQ 526, and an IO CQ 527. NVMe controller 2 528 can have controller configuration registers 529, an admin SQ 530, an admin CQ 531, an IO SQ 532, and an IO CQ 533. The controllers' configuration registers 523, 529 can be set up and maintained by the NAS 520.

A NVMe SQ is a submission queue that can accept submissions from a host machine or VM. The submissions can be requests to attach to a particular NAS or NVMe namespace, to store data, to return data, etc. A NVMe CQ is a completion queue that can receive the results of the submissions. For example, a submission that requests storage of data can have a completion that confirms successful storage of the data. The admin queues can be used for administrative requests such as attachment to a controller, getting or setting features, getting log pages, setting up IO queues, etc. The IO queues can service submissions for storing data into non-volatile storage or for returning data stored in non-volatile storage. Some implementations have no admin queues because the administrative transactions are handled via IO queues.

FIG. 5 has a SAN wherein PDUs (protocol data units) are carried between host networking 551 and NVMe-oF appliance networking 552 via fabric connections 550, 553. The PF fabric connection 550 can carry the PF's admin fabric PDUs 540 and IO fabric PDUs 541 between the host 501 and the NVMe-oF appliance networking 552. The VF fabric connection 553 can carry the VF's admin fabric PDUs 542 and IO fabric PDUs 543 between the host 501 and the NVMe-oF appliance networking 552.

The host 501 can place an administrative NVMe submission on PF admin SQ 506. The NIC can translate the NVMe submission into an admin fabric PDU 540 that is sent to the NAS 520 where it is translated to an NVMe submission that is placed onto admin SQ 524. NVMe controller 1 523 services the submission resulting in a NVMe completion on admin CQ 525. The NVMe completion is translated into an admin fabric PDU 540, returned to the host 501 via the SAN, and translated into a NVMe completion that is placed in PF admin CQ 507. The host 501 can then process the completion.

The host 501 can place an IO submission on PF IO SQ 508. The NIC can translate the submission into an IO fabric PDU 541 that is sent to the NAS 520 where it is translated to a submission that is placed onto IO SQ 526. NVMe controller 1 523 services the submission resulting in a completion placed on the IO CQ 527. The completion is translated into an IO fabric PDU 541, returned to the host 501 via the SAN, and translated into a completion that is placed in PF IO CQ 509. The host 501 can then process the completion.

The VM 502 can place an administrative submission on VF admin SQ 512. The NIC can translate the submission into an admin fabric PDU 542 that is sent to the NAS 520 where it is translated to a submission that is placed onto admin SQ 530. NVMe controller 2 528 services the submission resulting in a completion that is placed on admin CQ 531. The completion is translated into an admin fabric PDU 542, returned to the host 501 via the SAN, and translated into a completion that is placed in VF admin CQ 513. The VM 502 can then process the completion.

The VM 502 can place an IO submission on VF IO SQ 514. The NIC can translate the submission into an IO fabric PDU 543 that is sent to the NAS 520 where it is translated to a submission that is placed onto IO SQ 532. NVMe controller 2 528 services the submission resulting in a completion that is placed on IO CQ 533. The completion is translated into an IO fabric PDU 543, returned to the host 501 via the SAN, and translated into a completion that is placed in VF IO CQ 515. The VM 502 can then process the completion.

The specific protocol of the fabric PDUs 540, 541, 542, 543 can be any of the SAN protocols such as NVMe/TCP, NVMe/RoCE v1, NVMe/RoCE v2, iSCSI, or Infiniband. A configurable NIC, such as a NIC with a programmable packet processing pipeline can easily translate between NVMe submissions/completions and any of the SAN protocols.

Figure 6:
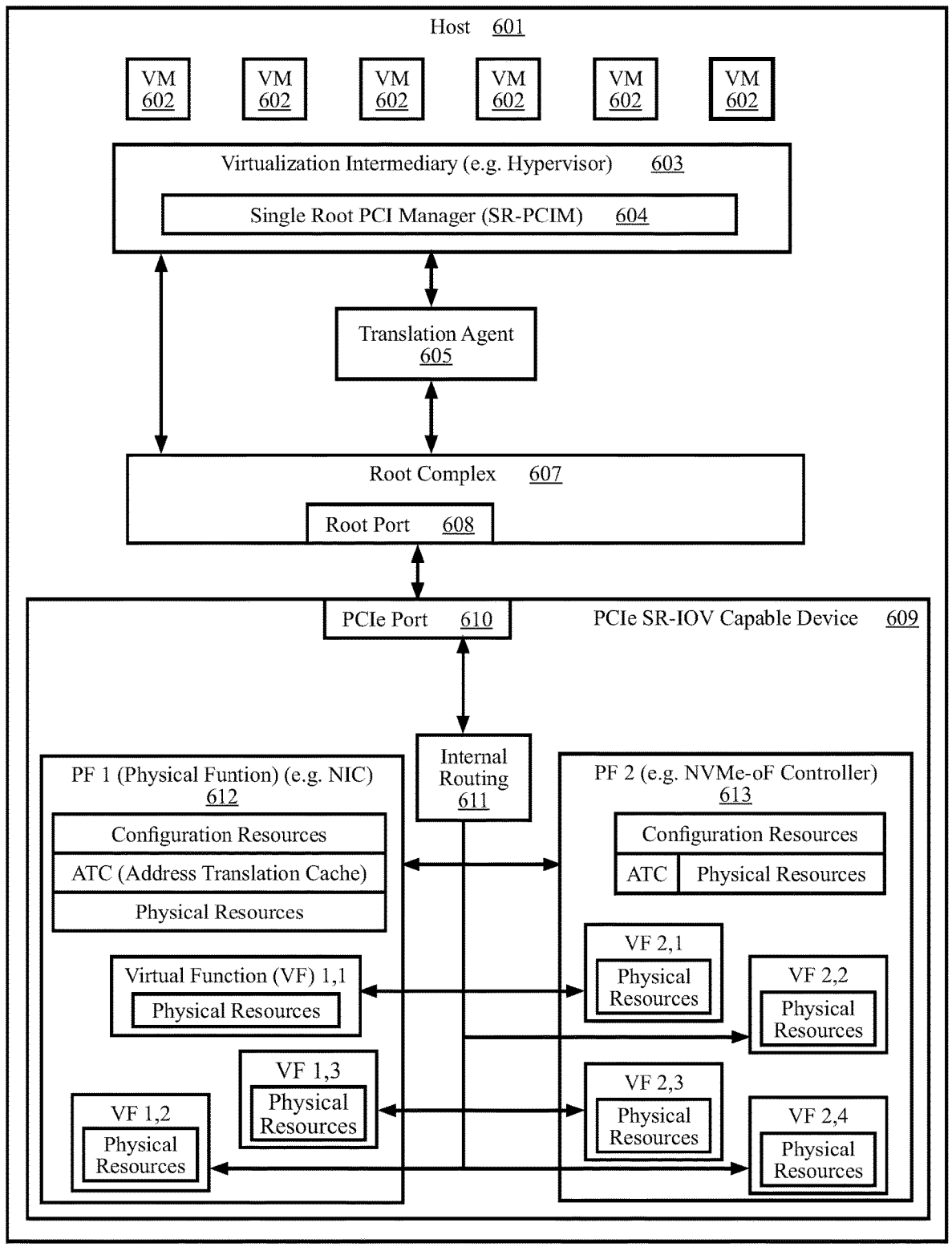
FIG. 6 is a high-level block diagram of VMs running on a host computer and accessing VFs (virtual functions) implemented by a PCIe SR-IOV capable device according to some aspects.

FIG. 6 is a high-level block diagram of VMs 602 running on a host computer 601 and accessing VFs (virtual functions) implemented by a PCIe SR-IOV capable device 609 according to some aspects. The PCI-SIG (peripheral component interconnect special interest group) is an electronic industry consortium that specifies the PCI and PCIe computer buses as well as the PCI SR-IOV specification. An interesting aspect of PCIe is that, even though it is called a computer bus, it actually carries packetized data between the computer's CPU (often via the "northbridge") and peripheral devices such as NICs, graphics cards, and non-volatile storage controllers.

Host 601 can run numerous VMs 602 under the control of a virtualization intermediary 603 such as a hypervisor. The virtualization intermediary 603 can communicate with a root complex 607 which, here, can simply be considered to be the host's PCI interface. The host 601 can communicate with a PCIe device via a root port 608 of the root complex 607 and the PCIe port 610 of the PCIe device. Internal routing 611 in the PCIe device can route the communications to registers in the PCIe device. The PCIe SR-IOV capable device 609 can be a PCIe card installed in the host computer 601. In accordance with the PCIe SR-IOV specifications, a SR-PCIM (single root PCI manager) can manage associations between the VMs and the VFs on the PCIe-SR-IOV capable PCIe device 609. Also, in accordance with the specifications, a translation agent 605 can translate memory space or IO space addresses referenced by the host 601 or VMs 602 into the addresses used by the PFs and VFs in the PCIe SR-IOV capable device 609.

The PCIe SR-IOV capable device 609 can act as both a NIC and a NVMe controller. As such, PF 1 612 of PCIe card 609 can be a NIC while PF 2 613 can be a NVMe interface. Each PF can have configuration resources (e.g. device registers), ATC (address translation cache), and physical resources. The address translation caches can speed data transactions between PCIe devices by caching address lookups. The physical resources are the components that implement the PFs and VFs. PF 1 is illustrated as having three VFs. PF 2, is illustrated as having four VFs. All the VFs are shown having some physical resources. For software defined VFs, those physical resources may simply be chunks of memory used as registers, queues, device storage, etc.

FIGS. 7-10 show standardized register locations and register contents for PCIe devices, NVMe PCIe devices, and SR-IOV capable NVMe-oF PCIe devices. The locations and contents are provided to show that the configuration information and data associated with each PF and each VF are available at locations that are specified by published standards and that data at those locations is in accordance with those published standards. In particular, each PF and VF has a PCIe state as indicated by PCIe resources such as PCIe header location and contents and device registers. Each PF also has a PF state and each VF has a VF state. The PF and VF states include configuration information and data such as IO buffers, queues, device state, connections (for NICS), attachments (for NVMe interfaces), etc.

FIG. 7 is a memory map diagram illustrating a non-limiting example of PCIe register locations for a NVMe interface 700 according to some aspects. The memory map of FIG. 7 is that provided in revision 1.4 of the NVM Express Specification. The NVM Express standards are an open collection of standards developed and maintained by a consortium originally called the NVM Express Work Group that is now incorporated as NVM Express, Inc. The PCIe register locations are relative to a base address. As such, the PCI header is located at the base address. The PCIe header has a specific size and format in accordance with the PCIe specification.

FIG. 8 is a memory map diagram illustrating a non-limiting example of a PCIe header for an NVMe device 800 according to some aspects. FIG. 7 provides a map of register locations whereas FIG. 8 details register contents for an NVMe device. The NVMe PCIe header of FIG. 8 is that provided in revision 1.4 of the NVM Express Specification. Note that the PCIe header for the NVMe device can be for local storage or remote storage. BAR0 and BAR1 can combine to form a 64-bit memory address at which the NVMe device registers are located.

FIG. 9 illustrates a non-limiting example of NVMe device registers 900 according to some aspects. The illustrated NVMe device registers are those specified by "NVM Express over Fabrics, Revision 1.1" published by NVM Express, Inc. on Oct. 22, 2019.

FIG. 10 illustrates a non-limiting example of extended capabilities registers for NVMe SR-IOV 1000 (single root input/output virtualization) according to some aspects. The illustrated PCIe registers are those specified by "Single Root I/O Virtualization and Sharing Specification Revision 1.1" published by PCI-SIG on Jan. 20, 2010. As can be seen, base addresses for the VFs are provided within these particular PCIe extended capabilities registers. In many embodiments, the PFs but none of the VFs have such a set of SR-IOV registers.

FIGS. 11A-11H illustrate packet headers and payloads of packets for network traffic flows 1100 and NAS (network attached storage) access according to some aspects. A network traffic flow 1100 can have numerous packets such as a first packet 1122, a second packet 1123, a third packet 1124, a fourth packet 1125, and a final packet 1126 with many more packets between the fourth packet 1125 and the final packet 1126. The term "the packet" or "a packet" can refer to any of the packets in a network traffic flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 111 as a raw bit stream or transmitted by TX MAC 110 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet has a layer 2 header 1101 and layer 2 payload 1102. The layer 2 header can contain a source MAC address 1103, a destination MAC address 1104, and other layer 2 header data 1105. The input ports 111 and output ports 110 of a network appliance 101 can have MAC addresses. In some embodiments a network appliance 101 has a MAC address that is applied to all or some of the ports. In some embodiments one or more of the ports each have their own MAC address. In general, each port can send and receive packets. As such, a port of a network appliance can be configured with a RX MAC 111 and a TX MAC 110. Ethernet, also known as Institute of Electrical and Electronics Engineers (IEEE) 802.3 is a layer 2 protocol. IEEE 802.11 (WiFi) is another widely used layer 2 protocol. The layer 2 payload 1102 can include a Layer 3 packet.

The internet layer, often called layer 3, is the network layer where layer 3 packets can be routed from a first node to a second node across multiple intermediate nodes. The nodes can be network appliances such as network appliance 101. Internet protocol (IP) is a commonly used layer 3 protocol. The layer 3 packet can have a layer 3 header 1106 and a layer 3 payload 1107. The layer 3 header 1106 can have a source IP address 1108, a destination IP address 1109, a protocol indicator 1110, and other layer 3 header data 1111. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 1103 indicating the first node, a destination MAC address 1104 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 1103 indicating the intermediate node, a destination MAC address 1104 indicating the second node, and the IP packet as a payload. The layer 3 payload 1107 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 1106 using protocol indicator 1110. Transmission control protocol (TCP), user datagram protocol (UDP), and internet control message protocol (ICMP) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 1107 includes a TCP header and a TCP payload. UDP can provide for computer applications to send messages, in this case referred to as datagrams, to other hosts on an IP network using a connectionless model. When carrying UDP data, a layer 3 payload 1107 includes a UDP header and a UDP payload. ICMP is used by network devices, including routers, to send error messages and operational information indicating success or failure when communicating with another IP address. ICMP uses a connectionless model.

A layer 4 packet can have a layer 4 header 1112 and a layer 4 payload 1113. The layer 4 header 1112 can include a source port 1114, destination port 1115, layer 4 flags 1116, and other layer 4 header data 1117. The source port and the destination port can be integer values used by host computers to deliver packets to application programs configured to listen to and send on those ports. The layer 4 flags 1116 can indicate a status of or action for a network traffic flow. For example, TCP has the RST, FIN, and ACK flags. RST indicates a TCP connection is to be immediately shut down and all packets discarded. A TCP FIN flag can indicate the final transmission on a TCP connection, packets transmitted before the FIN packet may be processed. ACK acknowledges received packets. A recipient of a FIN packet can ACK a FIN packet before shutting down its side of a TCP connection. A traffic flow can be terminated by a flow termination dialog. Examples of flow termination dialogs include: a TCP RST packet (with or without an ACK); and a TCP FIN packet flowed by a TCP ACK packet responsive to the TCP FIN packet. Other protocols also have well known flow termination dialogs. A layer 4 payload 1113 can contain a layer 7 packet.

The application layer, often called layer 7, includes the protocols used by most applications for providing user services or exchanging application data over the network connections established by the lower level protocols. Examples of application layer protocols include the Hypertext Transfer Protocol (HTTP), the File Transfer Protocol (FTP), the Simple Mail Transfer Protocol (SMTP), the Dynamic Host Configuration Protocol (DHCP), and the NVMe/TCP protocol. Data coded according to application layer protocols can be encapsulated into transport layer protocol units (such as TCP or UDP messages), which in turn use lower layer protocols to effect actual data transfer.

A layer 7 packet may be a NVMe/TCP PDU 1118 having a NVMe/TCP PDU header 1119 and a NVMe/TCP PDU payload 1120. NVMe/TCP is one of the common SAN protocols and can be used to implement NVMe-oF transactions between hosts and NAS appliances.

Figure 11A:
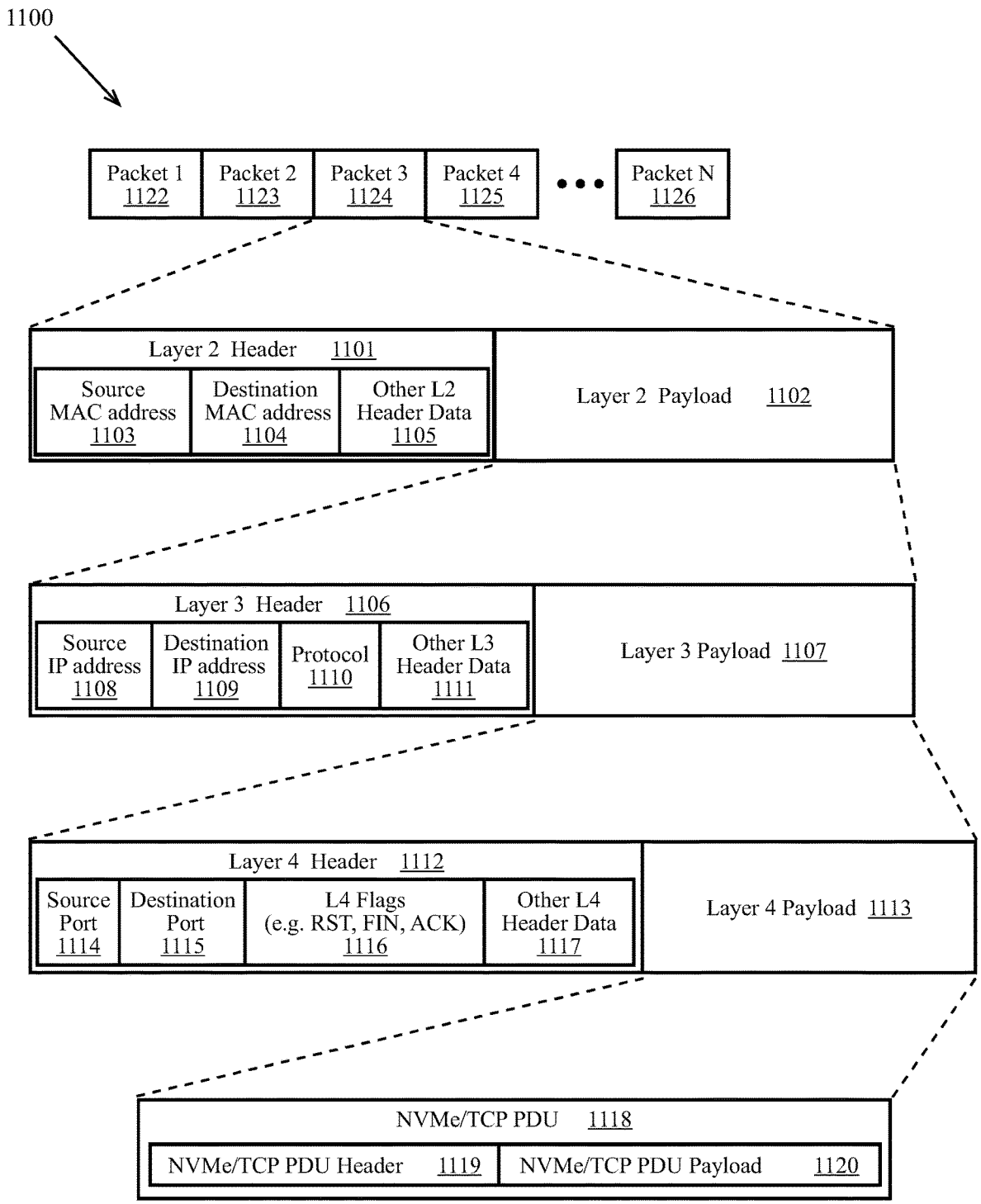
FIGS. 11A-11H illustrate packet headers and payloads of packets for network traffic flows and NAS (network attached storage) access according to some aspects.
Figure 11B:
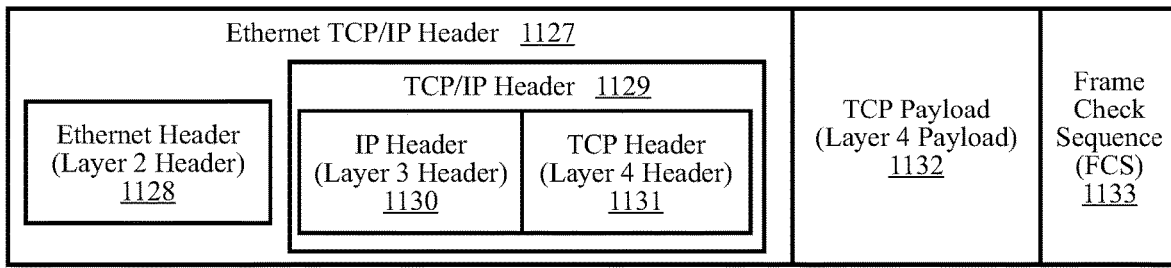
Figure 11C:
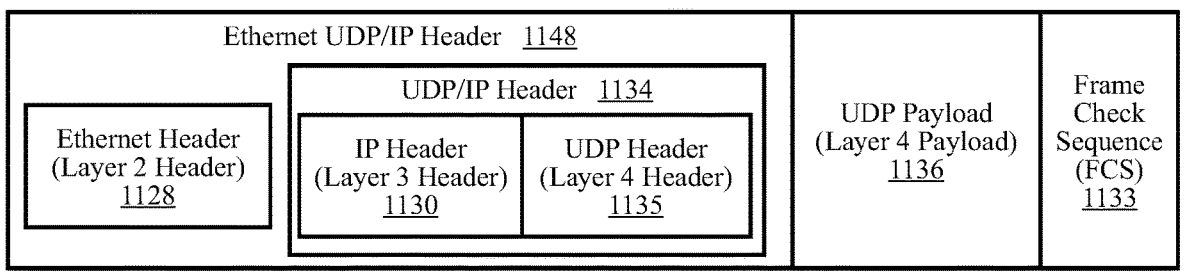

FIGS. 11B and 11C illustrate TCP/IP and UDP/IP Ethernet packets. Ethernet packets, such as TCP/IP and UDP/IP Ethernet packets, have an Ethernet header 1128 and a frame check sequence (FCS) 1133. As discussed above, Ethernet is a layer 2 protocol. An Ethernet TCP/IP header 1127 has an Ethernet header 1128 and a TCP/IP header 1129. The TCP/IP header 1129 has an IP header 1130 and a TCP header 1131. The Ethernet TCP/IP packet has a TCP payload 1132 as the layer 4 payload. An Ethernet UDP/IP packet differs from an Ethernet TCP/IP packet by having UDP as the layer 4 protocol. The Ethernet UDP/IP header 1148 has an Ethernet header 1128 and a UDP/IP header 1134. The UDP/IP header 1134 has an IP header 1130 and a UDP header 1135. The Ethernet UDP/IP packet has a UDP payload 1136 as the layer 4 payload.

NVMe is a communications protocol that has been used between hosts computers and NVMe controllers accessing non-volatile storage devices. NVMe was originally designed for carrying commands and data on a PCI bus between the host and non-volatile storage devices installed in the host (local storage). NVMe over Fabric (NVMe-oF) is a technology that adapts NVMe for attaching hosts to non-volatile storage devices connected over a network. Implementations of NVMe-oF include NVMe/TCP, NVMe/RoCE. (RDMA (remote direct memory access) over Converged Ethernet), and NVMe over Fibre Channel. There are currently two versions of NVMe/RoCE, NVMe/RoCE v1 and NVMe/RoCE v2. NVMe-oF is defined in "NVM Express over Fabrics," version 1.1, as published by NVM Express, Inc. on Oct. 22, 2019. RoCE is defined in "Supplement to Infini-Band Architecture Specification Volume 1 Release 1.2.1, Annex 16 RDMA over Converged Ethernet (RoCE)" as published by the Infiniband Trade Association on Apr. 6, 2010. RoCE v2 is defined in "Supplement to InfiniBand Architecture Specification Volume 1 Release 1.2.1, Annex 17 RoCEv2" as published by the Infiniband Trade Association on Sep. 2, 2014.

Figure 11D:
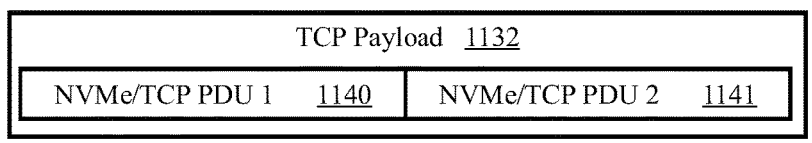
Figure 11E:
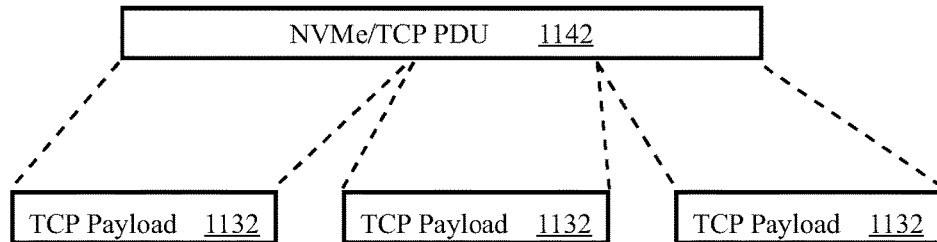

FIGS. 11D-11E illustrate the TCP payloads 1132 of NVME/TCP packets. FIG. 11D illustrates a single TCP/IP payload 1132 having multiple NVMe/TCP PDUs, NVMe/TCP PDU 1 1140 and NVMe/TCP PDU 2 1141. FIG. 11E illustrates multiple TCP payloads 1132 of multiple TCP packets carrying a single NVMe/TCP PDU 1142.

Figure 11F:
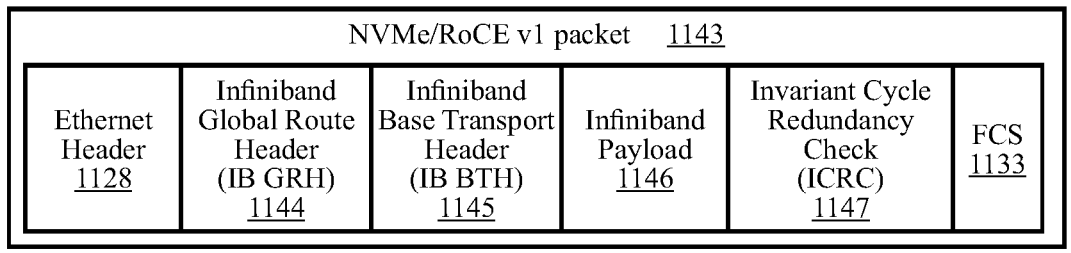

FIG. 11F illustrates a NVMe/RoCE v1 packet 1143. The NVMe/RoCE v1 packet 1143 can be seen to be an ethernet packet having an Ethernet payload that includes an Infiniband Global Route Header (IB GRH) 1144, an Infiniband Base Transport Header (IB BTH) 1145, an Infiniband payload 1146, and an Invariant Cyclic Redundancy Check (ICRC) 1147 field.

Figure 11G:
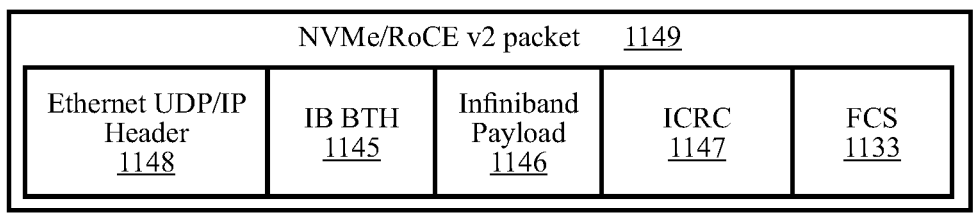

FIG. 11G illustrates a NVMe/RoCE v2 packet 1149. The NVMe/RoCE v2 packet 1149 can be seen to be an Ethernet UDP/IP packet having a UDP payload that includes the IB BTH 1145, the Infiniband payload 1146, and the ICRC 1147. Here, Ethernet is the layer 2 transport for a UDP packet carrying the Infiniband elements. Other layer 2 protocols may be used as the layer 2 transport.

Figure 11H:
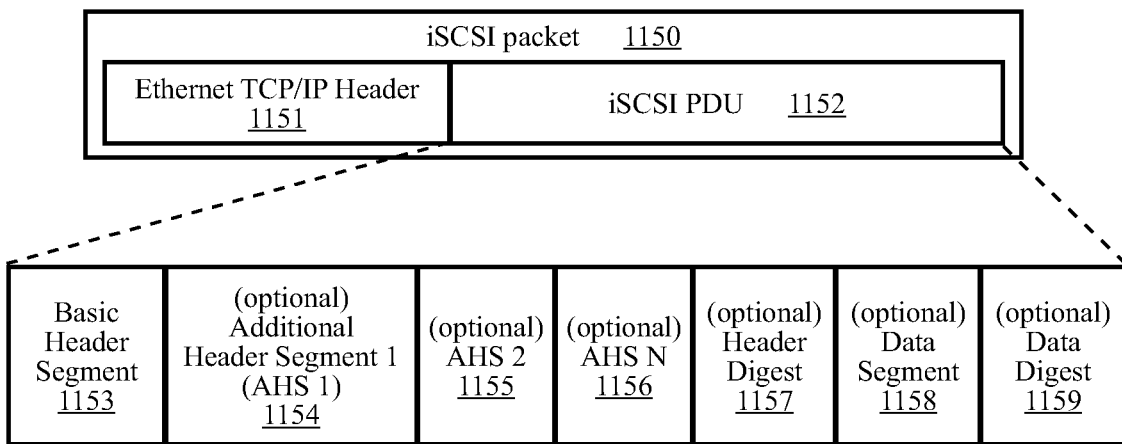

FIG. 11H illustrates an iSCSI packet 1150 having an Ethernet TCP/IP header 1151 and an iSCSI PDU 1152. The IETF (Internet Engineer Task Force) is a consortium that develops and publishes standards for the Internet in the form of RFCs (requests for comment). The iSCSI packet format is specified in IETF RFC 7143 titled "Internet Small Computer System Interface (iSCSI) Protocol", published in April, 2014. The iSCSI PDU 1152 can contain a basic header segment 1153, a first AHS (additional header segment) 1154, a second AHS 1155, an Nth AHS 1156, a header digest 1157, a data segment 1158, and a data digest 1159.

Figure 12:
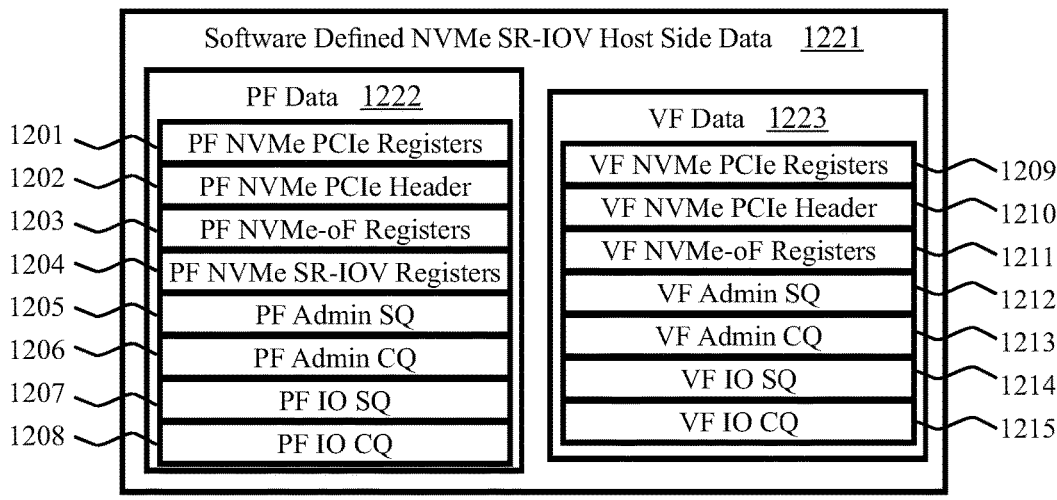
FIG. 12 is a high-level block diagram of a non-limiting example of software defined NVMe SR-IOV host side data according to some aspects.

FIG. 12 is a high-level block diagram of a non-limiting example of software defined NVMe SR-IOV host side data 1221 according to some aspects. FIG. 12 illustrates data that may be useful when migrating VFs between hosts. The NVMe SR-IOV host side data 1221 can include PF data 1222 and VF data 1223. The PF data 1222 can contain PF NVMe PCIe registers 1201, a PF NVMe PCIe header 1202, PF NVMe-oF registers 1203, PF NVMe SR-IOV registers 1204, a PF admin SQ 1205, a PF admin CQ 1206, a PF IO SQ 1207, and a PF IO CQ 1208. The VF data 1223 can contain VF NVMe PCIe registers 1209, a VF NVMe PCIe header 1210, VF NVMe-oF registers 1211, a VF admin SQ 1212, a VF admin CQ 1213, a VF IO SQ 1214, and a VF IO CQ 1215.

Figure 13:
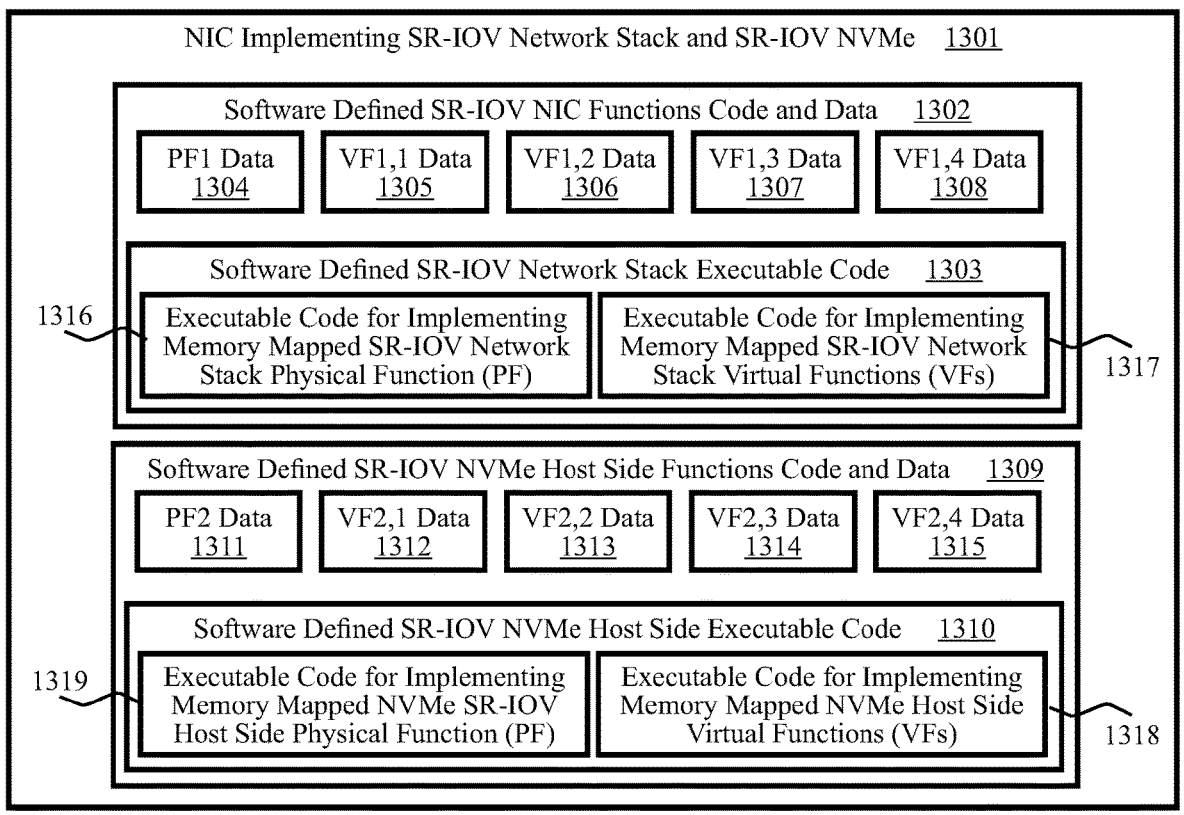
FIG. 13 is a high-level block diagram of a non-limiting example of a NIC (network interface card) implementing a SR-IOV network stack and SR-IOV NVMe according to some aspects.

FIG. 13 is a high-level block diagram of a non-limiting example of a NIC 1301 implementing a SR-IOV network stack and SR-IOV NVMe according to some aspects. As discussed above, a SR-IOV capable NIC having PF BAR mapping, VF BAR mapping, on board memory, and a configurable packet processing pipeline can be configured to implement a software defined NIC and a software defined NVMe interface. The NIC can contain software defined SR-IOV NIC functions code and data 1302 and software defined SR-IOV NVMe host side functions code and data 1309.

The software defined SR-IOV NIC functions code and data 1302 can contain software defined SR-IOV network stack executable code 1303. Network stack executable code can be executed by the NIC to process packets such as those of FIG. 11A-11H including reading, writing, rewriting, forwarding, and processing the packets. The code can include executable code for implementing a memory mapped SR-IOV network stack physical function (NIC PF) 1316 and executable code for implementing memory mapped SR-IOV network stack virtual functions (NIC VFs) 1317. The NIC PF is the PCIe card's first physical function, PF1. PF1 can have VFs such as VF1,1, VF1,2, VF1,3, and VF1,4. Implementing a software defined NIC PF includes maintaining PF1 data 1304. Implementing the VFs includes maintaining VF1,1 data 1305, VF1,2 data 1306, VF1,3 data 1307, and VF1,4 data 1308.

The software defined SR-IOV NVMe host side functions code and data 1309 can contain software defined SR-IOV NVMe host side executable code 1310. NVMe host side executable code can be executed by the NIC to process NVMe submissions and NVMe completions from the host and to access storage on a NAS via a SAN. The code can include executable code for implementing a memory mapped NVMe SR-IOV host side physical function (NVMe PF) 1319 and executable code for implementing memory mapped NVMe SR-IOV host side virtual functions (NVMe VFs) 1318. The NVMe PF is the PCIe card's second physical function, PF2. PF2 can have VFs such as VF2,1, VF2,2, VF2,3, and VF2,4. Implementing a software defined NVMe PF includes maintaining PF2 data 1311. Implementing the VFs includes maintaining VF2,1 data 1312, VF2,2 data 1313, VF2,3 data 1314, and VF2,4 data 1315.

Figure 14A:
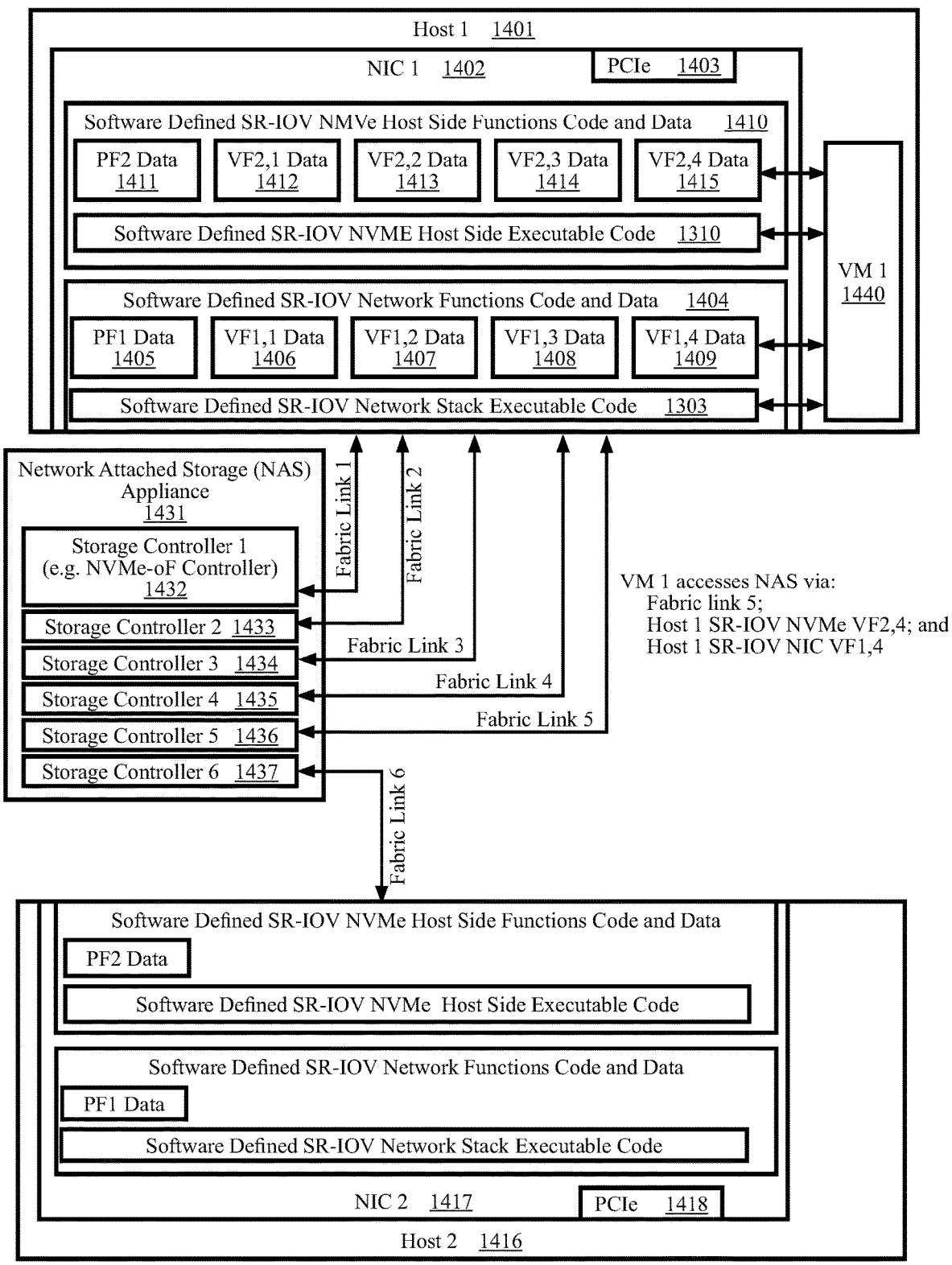
FIGS. 14A-14C illustrate a non-limiting example of migrating VFs in association with VMs from a first host computer to a second host computer according to some aspects.
Figure 14B:
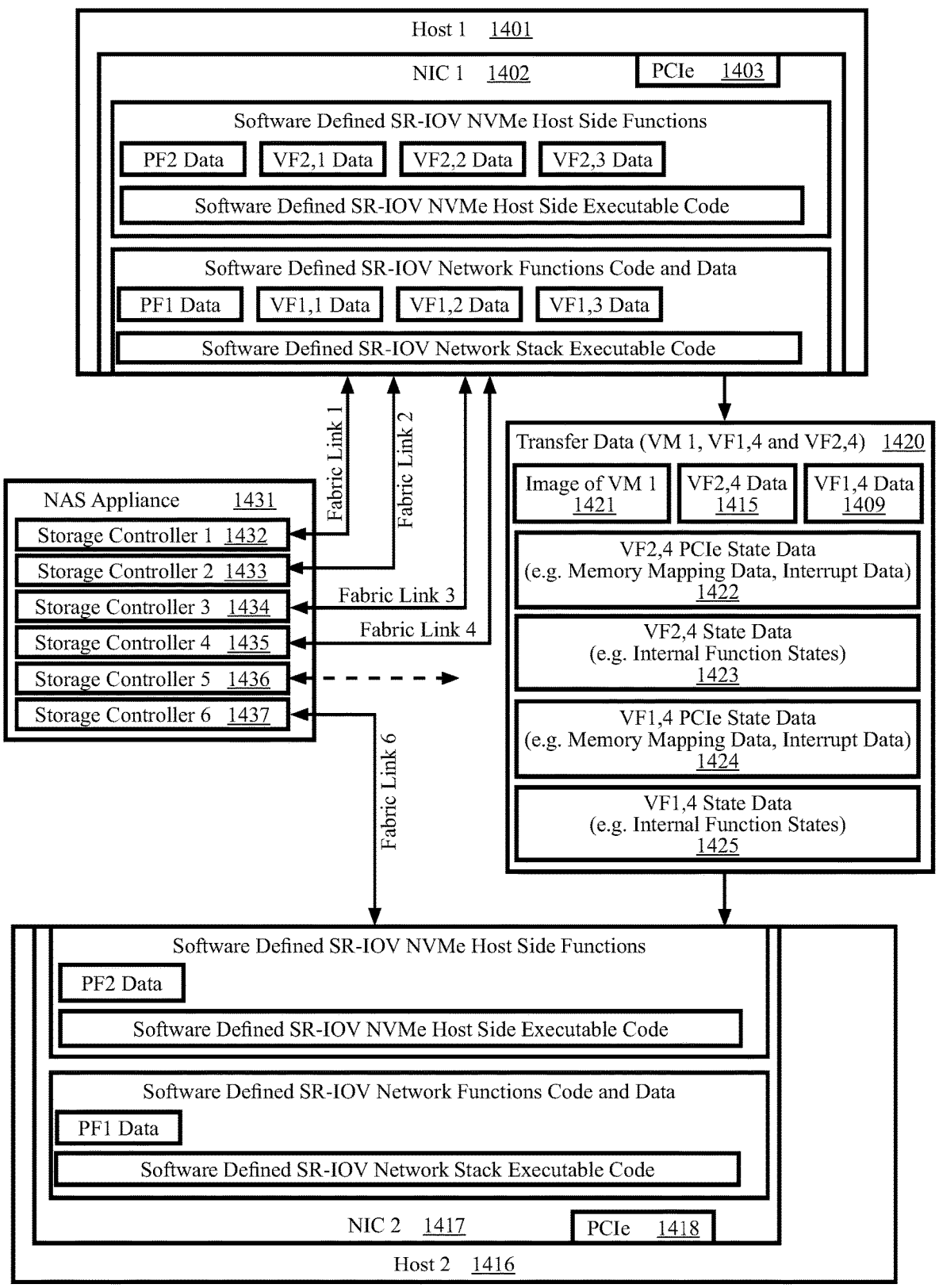
Figure 14C:
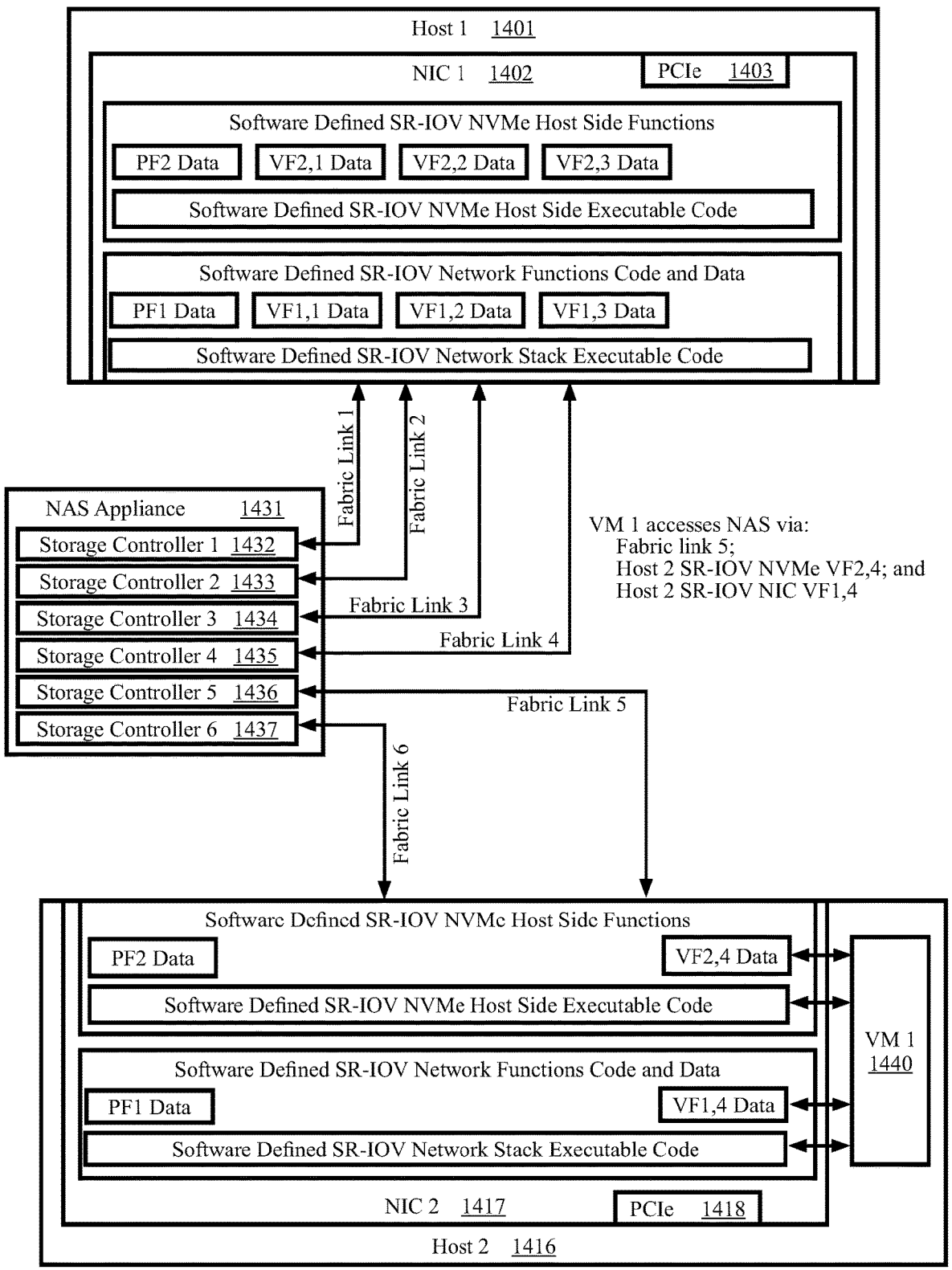

FIGS. 14A-14C illustrate a non-limiting example of migrating VFs in association with VMs from a first host computer 1401 to a second host computer 1416 according to some aspects. FIGS. 14A-14C illustrate NIC 1 1402 installed in host 1 1401 and NIC 2 1417 installed in host 2 1416. NIC 1 1402 has software defined SR-IOV network functions code and data 1404 and software defined SR-IOV NVMe host side functions code and data 1410. Software defined SR-IOV network functions code and data 1404 includes software defined SR-IOV network stack executable code 1303 and can maintain PF data and VF data such as PF1 data 1405, VF1,1 data 1406, VF1,2 data 1407, VF1,3 data 1408, and VF1,4 data 1409. Software defined SR-IOV NVMe host side functions code and data 1410 includes software defined SR-IOV NVMe host side executable code 1310 and can maintain PF data and VF data such as PF2 data 1411, VF2,1 data 1412, VF2,2 data 1413, VF2,3 data 1414, and VF2,4 data 1415. NIC 2 1417 also has software defined SR-IOV network functions code and data and software defined SR-IOV NVMe host side functions code and data. On NIC 2, software defined SR-IOV network functions code and data includes software defined SR-IOV network stack executable code and can maintain PF data and VF data such as PF1 data. On NIC 2, software defined SR-IOV NVMe host side functions code and data includes software defined SR-IOV NVMe host side executable code and can maintain PF data and VF data such as PF2 data.

Host 1 1401 and host 2 1416 can access remote storage on a NAS appliance 1431. NAS appliance 1431 has a number of storage controllers such as storage controller 1 1432, storage controller 2 1433, storage controller 3 1434, storage controller 4 1435, storage controller 5 1436, storage controller 6 1437. The storage controllers can provide access to non-volatile storage via fabric links such as fabric links 1-6. The storage controllers can be NVMe-oF storage controllers or can be accessible via other SAN protocols such as Infiniband, iSCSI, etc.

FIG. 14A illustrates VM 1 associated with VF1,4 1409 and VF2,4 1415. VM 1 uses VF1,4 1409 for network communications and accesses NAS appliance 1431 via fabric link 5 using VF2,4. VM 1 can access the NAS appliance 1431 via fabric link 5, host 1 SR-IOV NVMe VF2,4, and host 1 NIC VF1,4.

FIG. 14B illustrates VM 1 and the VFs associated with VM 1 migrating from host 1 1401 to host 2 1416 in the form of transfer data 1420 being transmitted from host 1 1401 to host 2 1416. The transfer data 1420 include an image of VM 1 1421, VF2,4 data 1415, VF1,4 data 1409, VF2,4 PCI state data 1422, VF2,4 state data 1423, VF1,4 PCIe state data 1424, and VF1,4 state data 1425. The PCIe state data can include memory mapping data, interrupt data, and other data specific to the PCIe interface. VF1,4 state data and VF2,4 state data can include internal function states such as state variable, status variables, and other data that is necessary for restarting a VF in a state that is consistent with the state in which it was stopped or quiesced. The state data may also contain IO buffers and queues. VF1,4 data may contain VF1,4 PCIe state data 1424, VF1,4 state data 1425, and other data. VF 2,4 data may contain VF2,4 PCI state data 1422, VF2,4 state data 1423, and other data. Those familiar with provisioning VMs are familiar with halting VMs and generating images of VMs.

FIG. 14C illustrates VM 1 1440 running on host 2 1416 along with its associated VFs. VF1,4 has been restarted within the software defined SR-IOV network functions code and data of NIC 2 1417. VF2,4 has been restarted within the software defined SR-IOV NVMe host side functions code and data of NIC 2 1417. Here, fabric link 5 has migrated along with the VM and VFs because VF1,4 preserved the link state and other data for its connection to storage controller 5 1436 and because VF2,4 preserved the state and other data for its attachment to storage controller 5 1436. Preserving links to and attachments to a NAS is a clear benefit of migrating VFs along with VMs.

Figure 15:
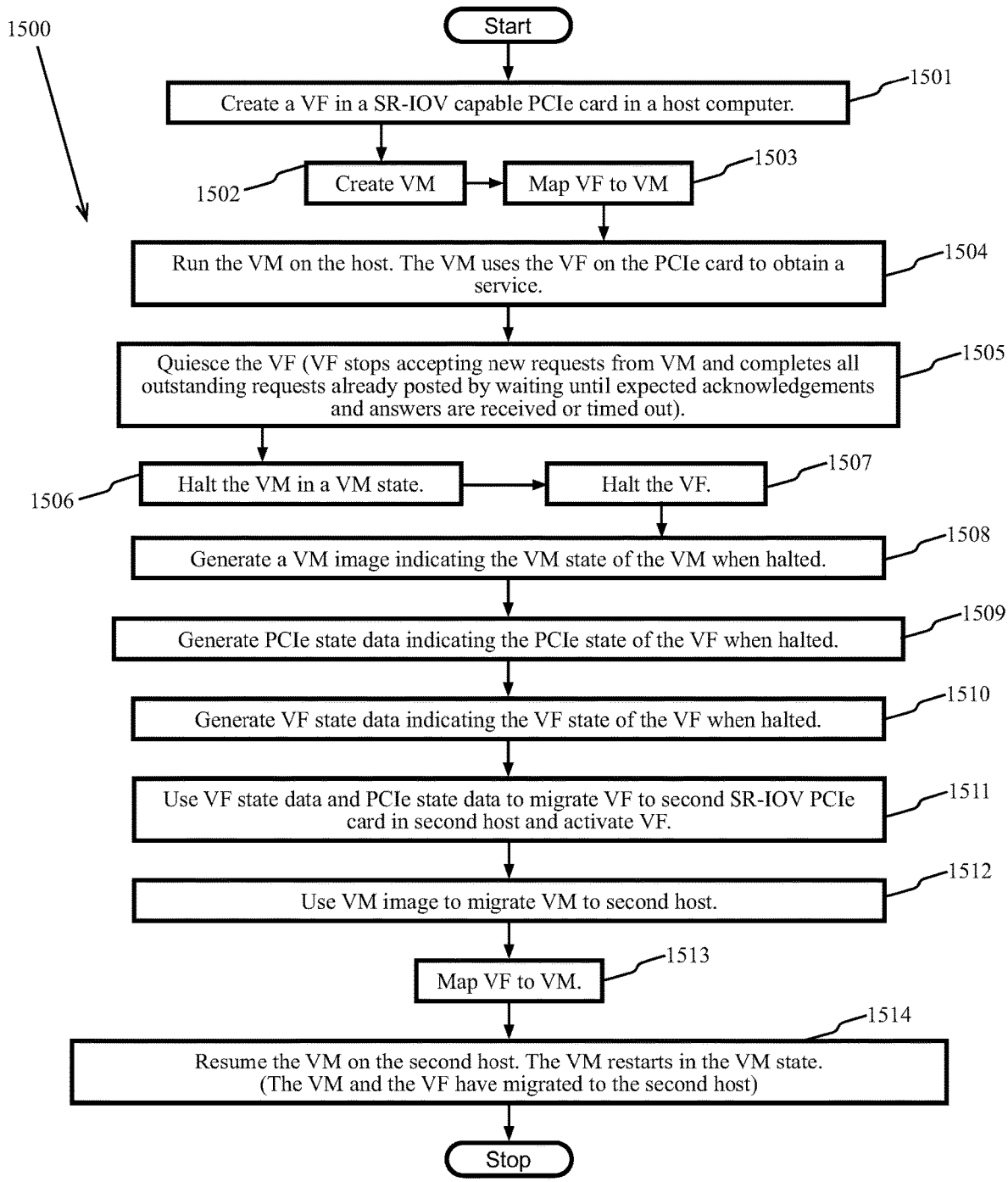
FIG. 15 is a high-level flow diagram of migrating a VF in association with a VM from a first host computer to a second host computer according to some aspects.

FIG. 15 is a high-level flow diagram of migrating a VF in association with a VM from a first host computer to a second host computer 1500 according to some aspects. Here, the SR-IOV PCIe card provides an unspecified service to a VM. After the start, at block 1501 the process creates a VF in a SR-IOV capable PCIe card in a host computer. At block 1502 the process creates a VM, and at block 1503 the process maps the VF to the VM. At block 1504 the process runs the VM on the host. The VM uses the VF on the PCIe card to obtain a service. At block 1505 the process quiesces the VF. While quiescing the VF stops accepting new requests from VM and completes all outstanding requests already posted by waiting until expected acknowledgements and answers are received or timed out.

At block 1506 the process halts the VM in a VM state. At block 1507 the process halts the VF. At block 1508 the process generates a VM image indicating the VM state of the VM when halted. At block 1509 the process generates PCIe state data indicating the PCIe state of the VF when halted. At block 1510 the process generates VF state data indicating the VF state of the VF when halted. At block 1511 the process uses the VF state data and the PCIe state data to migrate the VF to a second SR-IOV PCIe card in the second host and activates the VF. At block 1512 the process uses the VM image to migrate the VM to the second host. At block 1513 the process maps the VF to the VM. At block 1514 the process resumes the VM on the second host. The VM restarts in the VM state. The VM and the VF have migrated to the second host.

Figure 16:
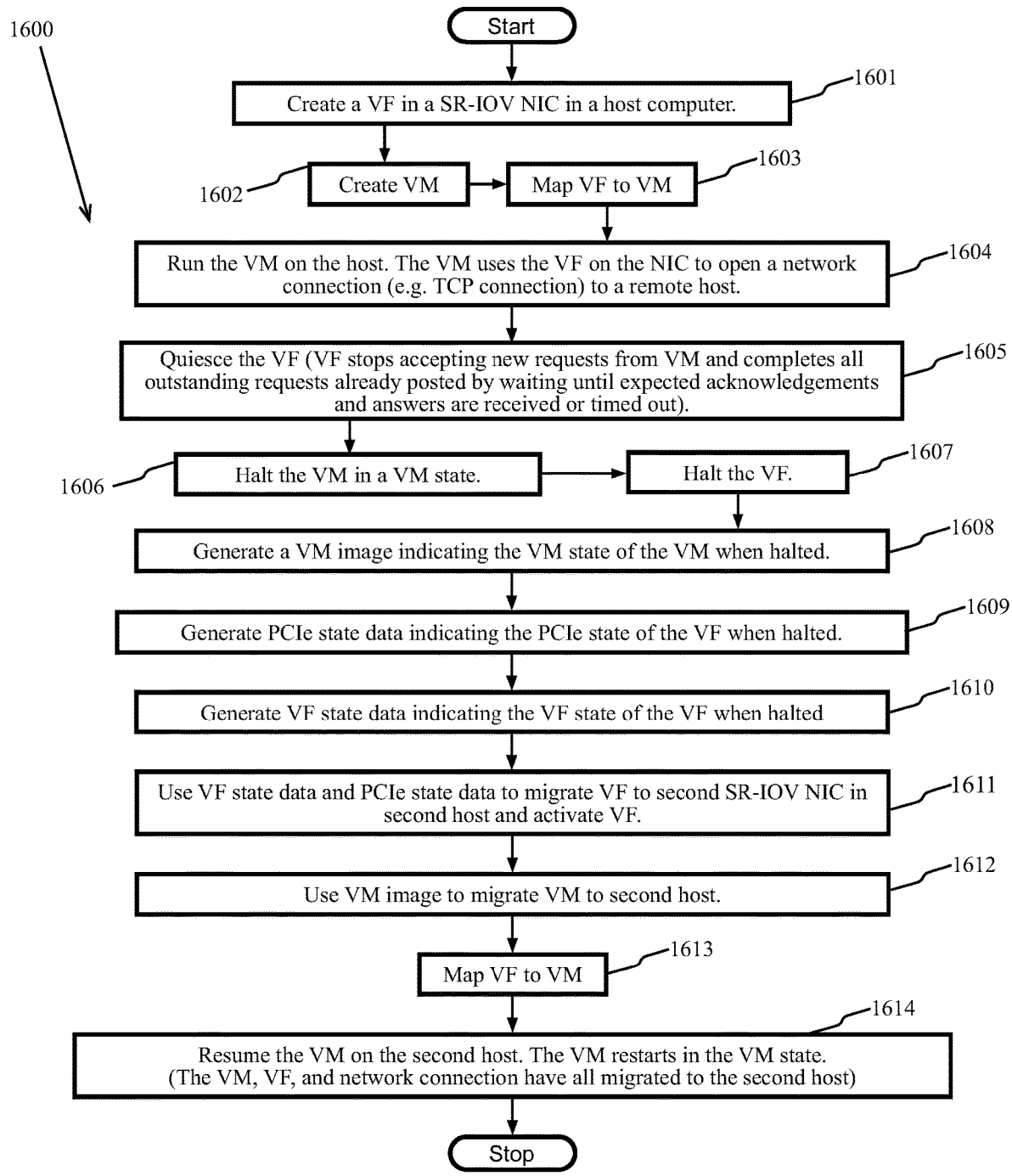
FIG. 16 is a high-level flow diagram of migrating a network accessing VF in association with a VM from a first host computer to a second host computer according to some aspects.

FIG. 16 is a high-level flow diagram of migrating a network accessing VF in association with a VM from a first host computer to a second host computer 1600 according to some aspects. Here, a SR-IOV NIC provides network connectivity to a VM. After the start, at block 1601 the process creates a VF in a SR-IOV NIC in a host computer. At block 1602 the process creates a VM, and at block 1603 the process maps the VF to the VM. At block 1604 the process runs the VM on the host. The VM uses the VF on the NIC to open a network connection (e.g. TCP connection) to a remote host. At block 1605 the process quiesces the VF. While quiescing the VF stops accepting new requests from VM and completes all outstanding requests already posted by waiting until expected acknowledgements and answers are received or timed out.

At block 1606 the process halts the VM in a VM state. At block 1607 the process halts the VF. At block 1608 the process generates a VM image indicating the VM state of the VM when halted. At block 1609 the process generates PCIe state data indicating the PCIe state of the VF when halted. At block 1610 the process generates VF state data indicating the VF state of the VF when halted. At block 1611 the process uses the VF state data and the PCIe state data to migrate the VF to a second SR-IOV NIC in the second host and activates the VF. At block 1612 the process uses the VM image to migrate the VM to the second host. At block 1613 the process maps the VF to the VM. At block 1614 the process resumes the VM on the second host. The VM, VF, and network connection have all migrated to the second host.

Figure 17:
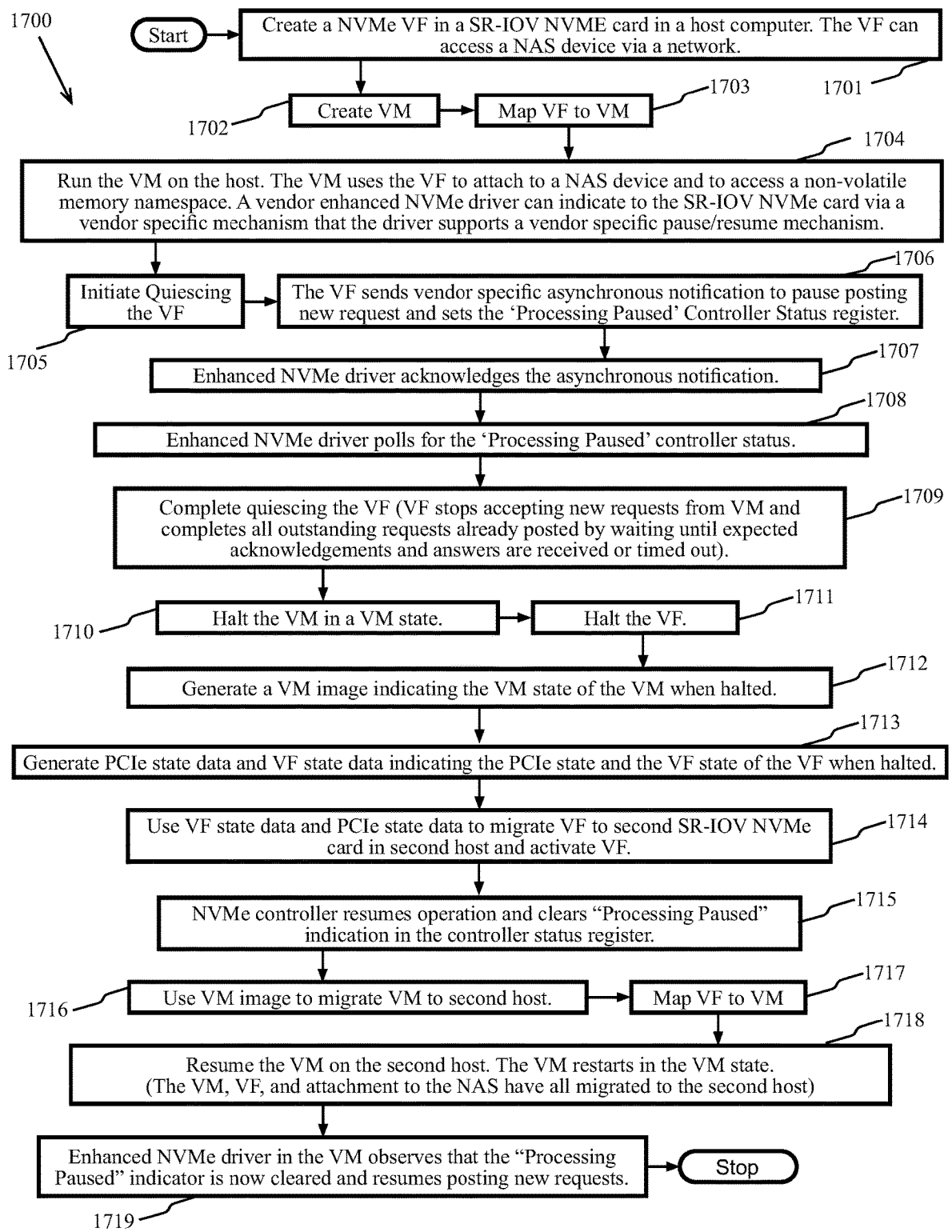
FIG. 17 is a high-level flow diagram of migrating a NAS accessing VF in association with a VM from a first host computer to a second host computer according to some aspects.

FIG. 17 is a high-level flow diagram of migrating a NAS accessing VF in association with a VM from a first host computer to a second host computer 1700 according to some aspects. Here, the SR-IOV NVMe card accesses a NAS for the VM. In some aspects, the vendor (or another entity) of the SR-IOV NVMe card may include vendor specific enhancement is the SR-IOV NVMe card and in a device driver used by the operating system to interact with the SR-IOV NVMe card. The enhancements can relate to additional or repurposed PCIe registers or NVMe device registers, customized or vendor specific NVMe commands, and to the driver code that leverages the enhancements. In general, vendor specific enhancements or capabilities are those added by a vendor but that are not (yet) part of an industry adopted specification.

After the start, at block 1701 the process creates a NVMe VF in a SR-IOV NVME card in a host computer. The VF can access a NAS device via a network. At block 1702 the process creates a VM, and at block 1703 the process maps the VF to the VM. At block 1704 the process runs the VM on the host. The VM uses the VF to attach to a NAS device and to access a non-volatile memory namespace. A vendor enhanced NVMe driver can indicate to the SR-IOV NVMe card via a vendor specific mechanism that the driver supports a vendor specific pause/resume mechanism. The vendor specific pause/resume mechanism can include writing to a PCIe register of a vendor specific PCIe register configuration (e.g. set a halt or quiesce flag). The vendor specific pause/resume mechanism can include issuing a vendor specific NVMe command (e.g. placing a vendor specific submission on the SQ). The vendor specific pause/resume mechanism can include any other out of band mechanism provided to the SR-IOV NVMe card via the PCIe interface or a network interface. At block 1705 the process initiates quiescing the VF. At block 1706 the VF may send a vendor specific asynchronous notification to pause posting new requests and may set the 'Processing Paused' controller status register. The paused indication event can be vendor specific, however the 'Processing Paused' bit in the NVMe status register is standard. Here, the VF can inform the VM that it should stop putting submissions on the SQs and can set a flag informing the VM that processing is paused.

At block 1707, an enhanced NVMe driver can acknowledge the asynchronous notification. The enhanced NVMe driver can be a device driver in the VM's operating system or in the host's operating system. The enhanced NVMe driver can acknowledge the asynchronous notification by reading a vendor specific log page for the notification. At block 1708, the enhanced NVMe driver begins polling for the 'Processing Paused' controller status. At block 1709, quiescing the VF completes. While quiescing the VF stops accepting new requests from VM and completes all outstanding requests already posted by waiting until expected acknowledgements and answers are received or timed out. At block 1710 the process halts the VM in a VM state. At block 1711 the process halts the VF. At block 1712 the process generates a VM image indicating the VM state of the VM when halted.

At block 1713 the process generates PCIe state data and VF state data indicating the PCIe state and the VF state of the VF when halted. At block 1714 the process uses the VF state data and the PCIe state data to migrate the VF to a second SR-IOV NVMe card in the second host and activates the VF. At block 1715 the NVMe controller resumes operation and clears the "Processing Paused" indication in the controller status register. At block 1716 the process uses the VM image to migrate the VM to the second host. At block 1717 the process maps the VF to the VM. At block 1718 the process resumes the VM on the second host. The VM restarts in the VM state. The VM, VF, and the attachment to the NAS have all migrated to the second host. At block 1719 the enhanced NVMe driver in the VM observes that the "Processing Paused" indicator is now cleared and resumes posting new requests.

Figure 18:
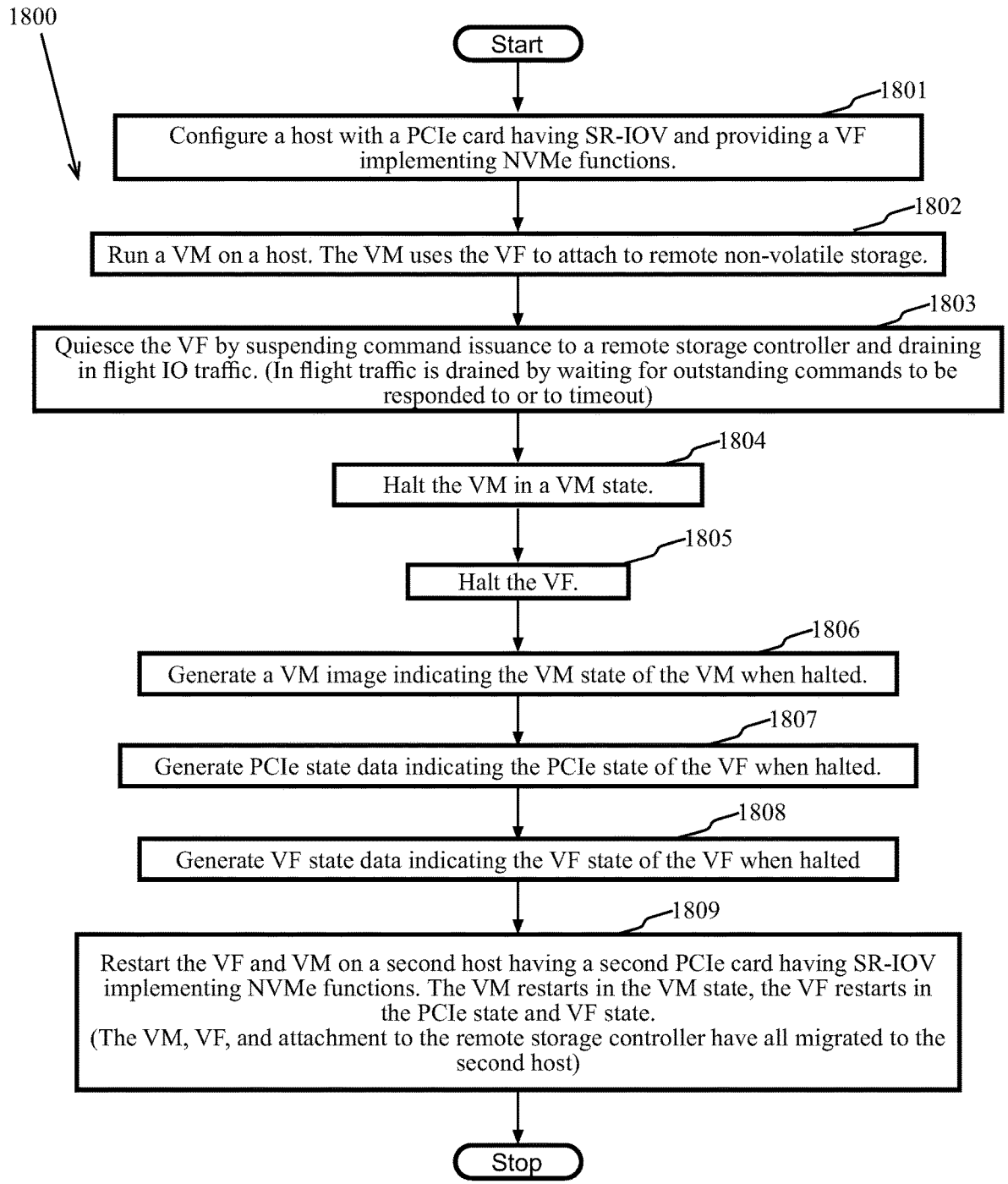
FIG. 18 is a high-level flow diagram of a method for running a VM in association with a VF on a first host and migrating the VF in association with the VM to a second host according to some aspects.

FIG. 18 is a high-level flow diagram of a method for running a VM in association with a VF on a first host and migrating the VF in association with the VM to a second host according to some aspects. After the start, at block 1801 a host is configured with a PCIe card having SR-IOV and providing a VF implementing NVMe functions. At block 1802, a VM is run on a host. The VM uses the VF to attach to remote non-volatile storage. At block 1803, the VF is quiesced by suspending command issuance to a remote storage controller and draining in flight IO traffic. In flight traffic is drained by waiting for outstanding commands to be responded to or to timeout. At block 1804, the VM is halted in a VM state. At block 1805, the VF is halted. At block 1806, the process generates a VM image indicating the VM state of the VM when halted. At block 1807, the process generates PCIe state data indicating the PCIe state of the VF when halted. At block 1808, the process generates VF state data indicating the VF state of the VF when halted. At block 1809, the VF and VM restart on a second host having a second PCIe card having SR-IOV and implementing NVMe functions. The VM restarts in the VM state. The VF restarts in the PCIe state and VF state. The VM, VF, and attachment to the remote storage controller have all migrated to the second host.

Figure 19:
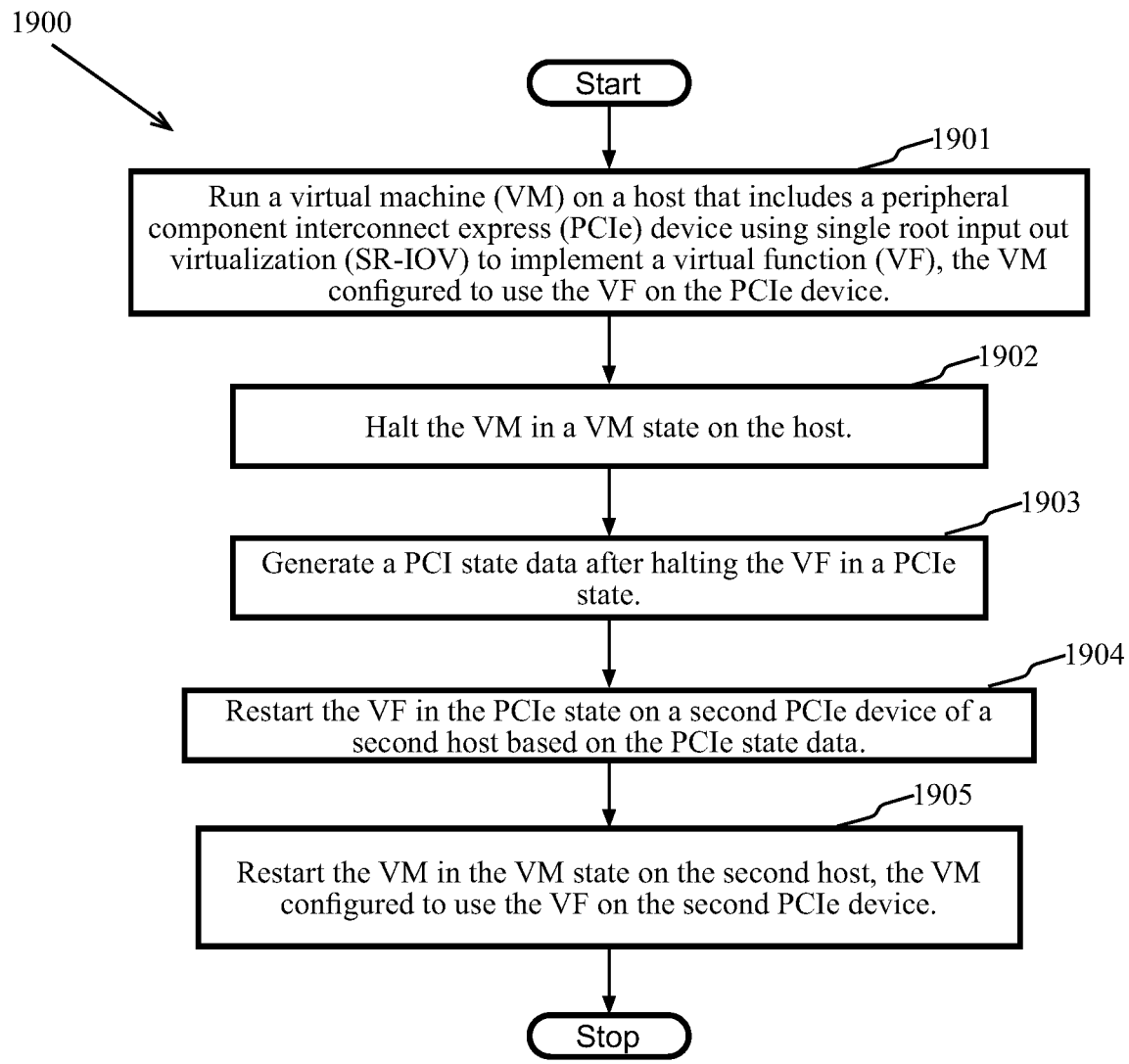
FIG. 19 is a high-level block diagram of a process for migrating virtual functions in association with virtual machines according to some aspects.

FIG. 19 is a high-level block diagram of a method for migrating virtual functions in association with virtual machines according to some aspects. After the start, at block 1901, the method runs a virtual machine (VM) on a host that includes a peripheral component interconnect express (PCIe) device using single root input out virtualization (SR-IOV) to implement a virtual function (VF), the VM configured to use the VF on the PCIe device. At block 1902, the method halts the VM in a VM state on the host. At block 1903, the method generates a PCI state data after halting the VF in a PCIe state. At block 1904, the method restarts the VF in the PCIe state on a second PCIe device of a second host based on the PCIe state data. At block 1905, the method restarts the VM in the VM state on the second host, the VM configured to use the VF on the second PCIe device.

Aspects described above can be ultimately implemented in a network appliance that includes physical circuits that implement digital data processing, storage, and communications. The network appliance can include processing circuits, ROM, RAM, CAM, and at least one interface (interface(s)). In an embodiment, the CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). In an embodiment, the network appliance may be embodied as a single IC device (e.g., fabricated on a single substrate) or the network appliance may be embodied as a system that includes multiple IC devices connected by, for example, a printed circuit board (PCB). In an embodiment, the interfaces may include network interfaces (e.g., Ethernet interfaces and/or InfiniB and interfaces) and/or PCI Express (PCIe) interfaces. The interfaces may also include other management and control interfaces such as I2C, general purpose I/Os, USB, UART, SPI, and eMMC.

As used herein the terms "packet" and "frame" may be used interchangeably to refer to a protocol data unit (PDU) that includes a header portion and a payload portion and that is communicated via a network protocol or protocols. In some embodiments, a PDU may be referred to as a "frame" in the context of Layer 2 (the data link layer) and as a "packet" in the context of Layer 3 (the network layer). For reference, according to the P4 specification: a network packet is a formatted unit of data carried by a packet-switched network; a packet header is formatted data at the beginning of a packet in which a given packet may contain a sequence of packet headers representing different network protocols; a packet payload is packet data that follows the packet headers; a packet-processing system is a data-processing system designed for processing network packets, which, in general, implement control plane and data plane algorithms; and a target is a packet-processing system capable of executing a P4 program.

Although the techniques are described herein in terms of processing packetized digital data as is common in digital communications networks, the techniques described herein are also applicable to processing digital data that is not packetized for digital communication using a network protocol. For example, the techniques described herein may be applicable to the encryption of data, redundant array of independent disks (RAID) processing, offload services, local storage operations, and/or segmentation operations. Although the techniques are described herein in terms of the P4 domain-specific language, the techniques may be applicable to other domain-specific languages that utilize a programmable data processing pipeline at the data plane.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

The invention claimed is:

1. A method comprising:
running a virtual machine (VM) on a host that includes a peripheral component interconnect express (PCIe) device using single root input output virtualization (SR-IOV) to implement a virtual function (VF), the VM configured to use the VF on the PCIe device;
quiescing the VF;
in response to quiescing the VF, halting the VM in a VM state and then obtaining a VM state data that indicates the VM state;
in response to quiescing the VF, halting the VF in a PCIe state and then obtaining a PCIe state data that indicates the PCIe state;
using the PCIe state data to restart the VF in the PCIe state on a second PCIe device of a second host; and
after restarting the VF, using the VM state data to restart the VM in the VM state on the second host such that the VM is configured to use the VF on the second PCIe device as soon as the VM is restarted.

2. The method of claim 1 wherein the VF has a VF state that includes a Non-Volatile Memory Express (NVMe) completion queue when halted on the host and the VF has the VF state when restarted on the second host.

3. The method of claim 1, further including:
after the VF is halted, obtaining a VF state data that indicates a VF state of the VF when halted; and
using the VF state data to migrate the VF to the second PCIe device,
wherein
the VF state includes a completion queue of the VF.

4. The method of claim 1 wherein the VF implements a network interface providing network access to the VM.

5. The method of claim 1 wherein:
the PCIe device is a network interface card that includes a central processing unit (CPU) and a memory; and
the VF is a software defined VF that uses a physical resource of the PCIe device to implement a Non-Volatile Memory Express (NVMe) VF.

6. The method of claim 1 wherein a transmission control protocol (TCP) connection between the VM and a remote non-volatile memory migrates to the second host when the VM and the VF migrate to the second host, and wherein the VF uses the TCP connection to transport NVMe/TCP protocol data units.

7. The method of claim 1 wherein the VM accesses a remote non-volatile memory via the VF, and quiescing the VF includes:
suspending processing of commands received from the VM;
suspending command issuance from a command queue; and
waiting for outstanding commands to be responded to or to timeout.

8. The method of claim 1 wherein halting the VF includes the VF pausing submission of new commands to a command queue by the VM.

9. The method of claim 1 wherein the VF implements networking functions and provides the VM with internet protocol communications on a computer network, wherein the PCIe device implements a second VF that implements SR-IOV NVMe host side functions and provides the VM with access to a remote non-volatile memory, and wherein the VF and the second VF are migrated to the second PCIe device.

10. A system comprising:
a peripheral component interconnect express (PCIe) device that uses single root input output virtualization (SR-IOV) to implement a virtual function (VF) used by a virtual machine (VM) running in a host that includes the PCIe device; and
a second PCIe device that is in a second host,
wherein the PCIe device quiesces the VF such that the VF stops accepting new requests from the VM and completes all outstanding requests already posted,
the host halts the VM and generates a VM image in response to quiescing the VF,
wherein, after the VM is halted, the PCIe device halts the VF in a PCIe state and generates a PCIe state data that indicates the PCIe state;
wherein the VM image is transferred to the second host,
wherein the PCIe state data is transferred to the second PCI device,
wherein the PCIe state data is used to restart the VF in the second PCIe device,
wherein the VM image is used for restarting the VM in the second host after the VF is restarted in the second PCIe device, and
wherein the VM uses the VF after the VM is restarted and the VF is restarted.

11. The PCIe device of claim 10 wherein the VF has a VF state when halted on the host and the VF has the VF state when restarted.

12. The PCIe device of claim 10 wherein the VF has a VF state when halted on the PCIe device and the VF has the VF state when restarted on the second PCIe device, the VF state including an NVMe admin queue.

13. The PCIe device of claim 10 wherein the VM accesses Non-Volatile Memory Express (NVMe) device registers of the VF, and the VM accesses a remote non-volatile memory via the VF.

14. The PCIe device of claim 10 wherein a TCP connection between the VM and a remote non-volatile memory migrates to the second host when the VM and the VF migrate to the second host.

15. The PCIe device of claim 10, wherein the VM accesses a remote non-volatile memory via the VF, and quiescing the VF includes:
suspending processing of commands received from the VM;
suspending command issuance from a command queue of the VF to the remote non-volatile memory; and
waiting for outstanding commands to be responded to or to timeout.

16. The PCIe device of claim 10 wherein issuing an async notification from the host to the VF pauses submission of new commands to a command queue by the VM.

17. The PCIe device of claim 10 wherein the VF implements SR-IOV NVMe host side functions and provides access to a remote non-volatile memory.

18. A system comprising:
a means for running a virtual function (VF) used by a virtual machine (VM) running in a host, the VF implemented via single root input output virtualization (SR-IOV);
a means for migrating the VM and the VF to a second host, wherein a VF state and a VM state are preserved during migration;

a means for preserving a PCIe state of the VF during migration; and a means for restarting the VF and the VM in the second host, the VM using the VF after-migrating to the second host, wherein migrating the VM and the VF to the second host includes quiescing the VF, then halting the VM in response to quiescing the VF, and then halting the VF, wherein restarting the VF in the second host includes using the means for preserving the PCIe state to restart the VF, and wherein restarting the VM and the VF in the second host includes restarting the VF before restarting the VM.

19. The system of claim 18 wherein the VM accesses Non-Volatile Memory Express (NVMe) device registers associated with the VF, and the VM accesses a remote non-volatile memory via the VF.

\* \* \* \* \*